US010671185B2

(12) United States Patent
Chandel et al.

(10) Patent No.: US 10,671,185 B2
(45) Date of Patent: Jun. 2, 2020

(54) SYSTEMS, METHODS, AND MEDIA FOR PROVIDING AN ENHANCED REMOTE CONTROL HAVING MULTIPLE MODES

(71) Applicant: Google LLC, Mountain View, CA (US)

(72) Inventors: Alok Chandel, Sunnyvale, CA (US); Pierre-Yves Laligand, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/188,193

(22) Filed: Nov. 12, 2018

(65) Prior Publication Data

US 2019/0079600 A1 Mar. 14, 2019

Related U.S. Application Data

(63) Continuation of application No. 15/682,063, filed on Aug. 21, 2017, now Pat. No. 10,126,840, which is a
(Continued)

(51) Int. Cl.
*G06F 3/0346* (2013.01)
*G08C 17/00* (2006.01)

(52) U.S. Cl.
CPC .......... *G06F 3/0346* (2013.01); *G08C 17/00* (2013.01); *G08C 2201/30* (2013.01);
(Continued)

(58) Field of Classification Search
CPC ............... G08C 17/00; G08C 2201/32; G08C 2201/40; G08C 2201/93; G08C 2201/30; G06F 3/0436
See application file for complete search history.

(56) References Cited

U.S. PATENT DOCUMENTS 5,545,857 A * 8/1996 Lee .................. G06F 3/04883
178/18.03
5,905,497 A 5/1999 Vaughan et al.
(Continued)

FOREIGN PATENT DOCUMENTS

CN 1527970 9/2004
CN 101518059 8/2009
(Continued)

OTHER PUBLICATIONS

Examination Report dated May 25, 2018 in EP Patent Application No. 14716691.2.
(Continued)

*Primary Examiner* — Thomas D Alunkal
(74) *Attorney, Agent, or Firm* — Byrne Poh LLP

(57) ABSTRACT

Systems, methods, and media for providing a multipurpose remote control are provided. In some implementations, a system for controlling a media device is provided, the system comprising: a hardware processor connected to a touch sensor, a directional input region, and a motion sensor, wherein the hardware processor is configured to: detect that the touch sensor is activated for a predetermined period of time; and upon detecting that the touch sensor has been activated for the predetermined period of time, switching from a first mode to a second mode, wherein: the first mode comprises controlling a highlighted region displayed on the media device in response to an input provided on the directional input region and selecting an item corresponding to the highlighted region in response to depression of the touch sensor; and the second mode comprises controlling a position of a cursor displayed on the media device in
(Continued)

response to an output of the motion sensor, selecting an item corresponding to the position of the cursor in response to depression of the touch sensor, and inhibiting the display of the highlighted region.

21 Claims, 10 Drawing Sheets

Related U.S. Application Data continuation of application No. 13/800,891, filed on Mar. 13, 2013, now Pat. No. 9,740,304.

(52) U.S. Cl.
CPC ..... *G08C 2201/32* (2013.01); *G08C 2201/40* (2013.01); *G08C 2201/92* (2013.01); *G08C 2201/93* (2013.01)

(56) References Cited

U.S. PATENT DOCUMENTS

| | | | |
|---|---|---|---|
| 6,344,795 B1 | 2/2002 | Gehlot | |
| 6,765,557 B1* | 7/2004 | Segal | G06F 3/0488 345/173 |
| 6,947,062 B2* | 9/2005 | Cuijpers | G06F 3/0481 345/159 |
| 7,030,856 B2 | 4/2006 | Dawson et al. | |
| 8,130,134 B2 | 3/2012 | Liou | |
| 8,194,038 B1 | 6/2012 | Henty et al. | |
| 8,237,871 B2 | 8/2012 | Lad | |
| 9,740,304 B2 | 8/2017 | Chandel et al. | |
| 2002/0083449 A1 | 6/2002 | Im | |
| 2005/0264538 A1* | 12/2005 | Yeh | G06F 3/03547 345/173 |
| 2005/0266891 A1 | 12/2005 | Mullen | |
| 2007/0058047 A1* | 3/2007 | Henty | G06F 3/0304 348/211.99 |
| 2008/0174551 A1* | 7/2008 | Ishibashi | H04N 5/4403 345/158 |
| 2008/0268780 A1 | 10/2008 | Werner et al. | |
| 2009/0127977 A1 | 5/2009 | So et al. | |
| 2009/0138907 A1* | 5/2009 | Wiser | H04N 5/4403 725/34 |
| 2010/0073567 A1* | 3/2010 | Lee | G06F 3/0202 348/569 |
| 2010/0083312 A1* | 4/2010 | White | H04N 5/4403 725/39 |
| 2010/0127977 A1* | 5/2010 | Sung | G06F 3/03547 345/157 |
| 2010/0177042 A1 | 7/2010 | Chen | |
| 2011/0171937 A1 | 7/2011 | Hill et al. | |
| 2011/0300804 A1 | 12/2011 | Lu | |
| 2012/0013536 A1* | 1/2012 | VanDuyn | G06F 3/0231 345/169 |
| 2012/0052922 A1 | 3/2012 | Li | |
| 2012/0194976 A1 | 8/2012 | Golko et al. | |
| 2012/0200497 A1 | 8/2012 | Nasiri et al. | |
| 2012/0212678 A1 | 8/2012 | Wang | |
| 2012/0242576 A1* | 9/2012 | Mizunuma | G06F 1/1626 345/158 |
| 2013/0128127 A1 | 5/2013 | Xu et al. | |
| 2013/0179168 A1* | 7/2013 | Bae | G10L 21/00 704/248 |

FOREIGN PATENT DOCUMENTS

| | | |
|---|---|---|
| CN | 101739155 | 6/2010 |
| CN | 102364544 | 2/2012 |
| CN | 102595224 | 7/2012 |
| CN | 202353685 | 7/2012 |

OTHER PUBLICATIONS

International Preliminary Report on Patentability dated Sep. 15, 2015 in International Patent Application No. PCT/US2014/024342.
International Search Report and Written Opinion dated Sep. 1, 2014 in International Patent Application No. PCT/US2014/024342.
Notice of Allowance dated Apr. 20, 2017 in U.S. Appl. No. 13/800,891.
Notice of Allowance dated Jul. 10, 2018 in U.S. Appl. No. 15/682,063.
Office Action dated Feb. 21, 2018 in U.S. Appl. No. 15/682,063.
Office Action dated Feb. 24, 2016 in U.S. Appl. No. 13/800,891.
Office Action dated May 19, 2015 in U.S. Appl. No. 13/800,891.
Office Action dated Jun. 27, 2018 in CN Patent Application No. 201480023897.8.
Office Action dated Aug. 4, 2016 in U.S. Appl. No. 13/800,891.
Office Action dated Nov. 30, 2016 in U.S. Appl. No. 13/800,891.
Office Action dated Dec. 3, 2014 in U.S. Appl. No. 13/800,891.
Office Action dated Dec. 18, 2018 in CN Patent Application No. 201480023897.8.
Office Action dated Dec. 26, 2018 in U.S. Appl. No. 16/188,219.
Office Action dated Jul. 10, 2019 in U.S. Appl. No. 16/188,219.
Office Action dated Oct. 25, 2019 in U.S. Appl. No. 16/188,219.
Notice of Allowance dated Mar. 20, 2020 in KR Patent Application No. 10-2015-7028593.
Notice of Allowance dated Feb. 5, 2020 in U.S. Appl. No. 16/188,219.

\* cited by examiner

SYSTEMS, METHODS, AND MEDIA FOR PROVIDING AN ENHANCED REMOTE CONTROL HAVING MULTIPLE MODES

CROSS-REFERENCE TO RELATED APPLICATIONS

This application is a continuation of U.S. patent application Ser. No. 15/682,063, filed Aug. 21, 2017, which is a continuation of U.S. patent application Ser. No. 13/800,891, filed Mar. 13, 2013, each of which is hereby incorporated by reference herein in its entirety.

TECHNICAL FIELD

The disclosed subject matter relates to systems, methods, and media for providing an enhanced remote control having multiple modes.

BACKGROUND

Many users like to multi-task while watching television. In some cases, a user may like to access webpages, such as a social networking website or a search engine website, or chat with a friend while watching television. These activities can draw the user away from television to a personal computer, a cell phone, or another network connected device.

Some television systems allow the user to display Internet content along with television content. Such a television system can allow the user to perform searches for content that is available on the Internet. For example, a user may browse to a website for accessing a search engine. At the search engine website, the user enters a search query that generally includes words, phrases, and/or other operators describing what the user is searching for. The search engine processes the search query and returns search results to the user. Such search results generally include links to webpages or other content available on the Internet that are responsive to one or more terms in the search query. The user can then select a link in the search results to navigate to the corresponding webpage. To control such a television system, a remote control that allows the user to navigate through television content is typically supplemented with a wireless keyboard that allows the user to navigate through Internet content.

With the advent of such television systems and as the number of media devices continues to increase (e.g., a digital video recorder), these combined user input devices suffer from various problems, such as the undesirable cost of multiple user input devices, a confusing number of functions provided by each user input device, and clutter in the environment where the television system is located.

Accordingly, it is desirable to provide systems, methods, and media for providing an enhanced remote control having multiple modes.

SUMMARY

In accordance with various implementations of the disclosed subject matter, systems, methods, and media for providing an enhanced remote control having multiple modes are provided.

In accordance with some implementations of the disclosed subject matter, a system for controlling a media device is provided, the system comprising: a hardware processor connected to a touch sensor, a directional input region, and a motion sensor, wherein the hardware processor is configured to: detect that the touch sensor is activated for a predetermined period of time; and upon detecting that the touch sensor has been activated for the predetermined period of time, switching from a first mode to a second mode, wherein: the first mode comprises controlling a highlighted region displayed on the media device in response to an input provided on the directional input region and selecting an item corresponding to the highlighted region in response to depression of the touch sensor; and the second mode comprises controlling a position of a cursor displayed on the media device in response to an output of the motion sensor, selecting an item corresponding to the position of the cursor in response to depression of the touch sensor, and inhibiting the display of the highlighted region.

In some implementations, the touch sensor further comprises at least one of: a capacitive touch sensor, a resistive touch sensor, and a piezoelectric touch sensor.

In some implementations, the hardware processor is further configured to detect a signal from the touch sensor that is indicative of a presence of a conductor in proximity to a surface of the touch sensor.

In some implementations, the touch sensor further comprises a plurality of touch sensitive detectors, and wherein the hardware processor is further configured to control a page displayed by the media device in response to receiving one or more signals from one or more of the plurality of touch sensitive detectors indicative of motion relative to one or more of the plurality of touch sensitive detectors.

In some implementations, the second mode further comprises controlling a position of a viewport displayed on the media device in response to receiving one or more signals indicative of an input provided on the directional input region.

In some implementations, the second mode further comprises detecting that the touch sensor is not activated for a second predetermined period of time, and wherein the hardware processor is further configured to switch from the second mode to the first mode upon detecting that the touch sensor has not been activated for the second predetermined period of time.

In some implementations, the first mode further comprises detecting a predetermined motion in response to receiving one or more signals from the motion sensor, and wherein the hardware processor is further configured to switch from the first mode to the second mode in response to detecting the predetermined motion.

In some implementations, the second mode further comprises controlling a position of a selected item displayed on the media device to coincide with the position of the cursor displayed on the media device in response to detecting continued depression of the touch sensor.

In accordance with some implementations of the disclosed subject matter, a system for controlling a media device is provided, the system comprising: means for detecting that a selectable touch sensor is activated for a predetermined period of time; and means for switching from a first mode to a second mode upon detecting that the selectable touch sensor has been activated for the predetermined period of time, wherein: the first mode comprises causing a position of a highlighted region displayed by the media device to be controlled in response to means for receiving directional input receiving a signal indicative of a directional input and causing an item corresponding to the highlighted region displayed by the media device to be selected in response to means for receiving a selection receiving a signal indicative of selection of the selectable touch sensor; and the second mode comprises causing a position of a cursor displayed by the media device to be controlled in response to means for receiving motion signals receiving a signal indicative of motion, selecting an item corresponding to the position of the cursor in response to the means for receiving a selection receiving a signal indicative of selection of the selectable touch sensor, and causing display of the highlighted region to be inhibited.

In some embodiments, the system further comprises means for detecting a signal indicative of activation of at least one of: a capacitive touch sensor, a resistive touch sensor, and a piezoelectric touch sensor.

In some embodiments, the system further comprises means for detecting a signal from the selectable touch sensor that is indicative of a presence of a conductor in proximity to a surface of the selectable touch sensor.

In some embodiments, the system further comprises means for detecting a signal indicative of motion across one or more of a plurality of touch sensitive detectors; and means for causing a page displayed by the media device to be changed in response to the hardware processor detecting the signal indicative of motion across one or more of the plurality of touch sensitive detectors.

In some embodiments, the second mode further comprises causing a position of a viewport displayed by the media device to be controlled in response to the means for receiving directional input receiving one or more signals indicative of a directional input.

In some embodiments, the second mode further comprises detecting that the selectable touch sensor is not activated for a second predetermined period of time, and switching from the second mode to the first mode upon detecting that the selectable touch sensor has not been activated for the second predetermined period of time.

In some embodiments, the first mode further comprises detecting a predetermined motion in response to receiving one or more signals from the motion sensor, and switching from the first mode to the second mode in response to detecting the predetermined motion.

In some embodiments, the second mode further comprises causing a position of a selected item displayed by the media device to coincide with the position of the cursor displayed by the media device in response to the hardware processor detecting a signal indicative of continued selection of the selectable touch sensor.

In accordance with some embodiments of the disclosed subject matter, a method for controlling a media device is provided, the method comprising: detecting, using a hardware processor, that a selectable touch sensor is activated for a predetermined period of time; and, upon detecting that the selectable touch sensor has been activated for the predetermined period of time, switching from a first mode to a second mode, wherein: the first mode comprises causing a position of a highlighted region displayed by the media device to be controlled in response to the hardware processor receiving a signal indicative of a directional input and causing an item corresponding to the highlighted region displayed by the media device to be selected in response to the hardware processor receiving a signal indicative of selection of the selectable touch sensor; and the second mode comprises causing a position of a cursor displayed by the media device to be controlled in response to the hardware processor receiving a signal indicative of motion, selecting an item corresponding to the position of the cursor in response to the hardware processor receiving a signal indicative of selection of the selectable touch sensor, and causing display of the highlighted region to be inhibited.

In accordance with some embodiments of the disclosed subject matter, a non-transitory computer-readable medium containing computer executable instructions that, when executed by a processor, cause the processor to perform a method for controlling a media device is provided, the method comprising: detecting that a selectable touch sensor is activated for a predetermined period of time; and, upon detecting that the touch sensor has been activated for the predetermined period of time, switching from a first mode to a second mode, wherein: the first mode comprises causing a position of a highlighted region displayed by the media device to be controlled in response to receiving a signal indicative of a directional input and causing an item corresponding to the highlighted region displayed by the media device to be selected in response to a receiving a signal indicative of selection of the selectable touch sensor; and the second mode comprises causing a position of a cursor displayed by the media device to be controlled in response to receiving a signal indicative of motion, selecting an item corresponding to the position of the cursor in response to receiving a signal indicative of selection of the selectable touch sensor, and causing display of the highlighted region to be inhibited.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
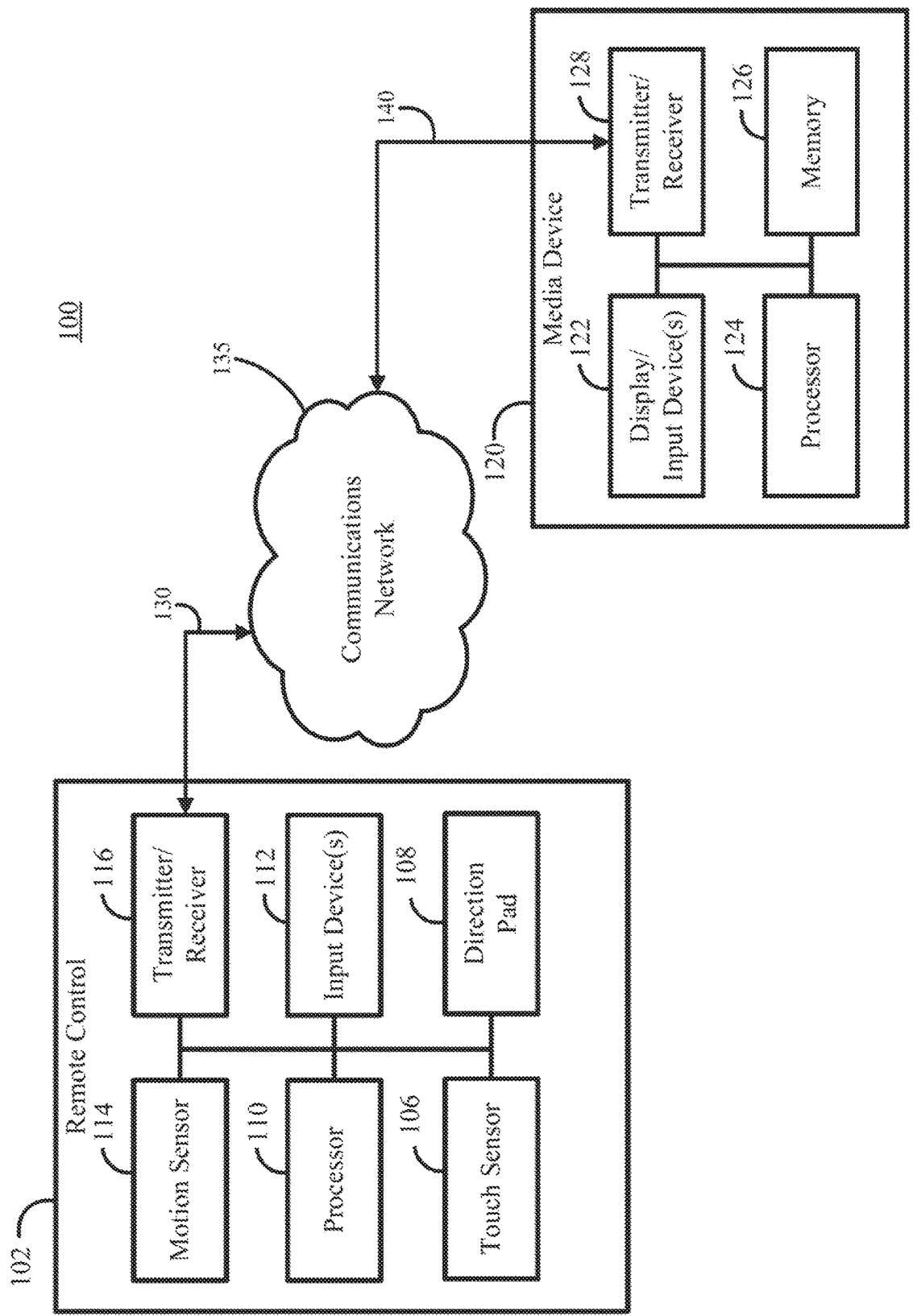
FIG. 1 shows an illustrative example of a schematic diagram of a system including an enhanced remote control in accordance with some implementations of the disclosed subject matter.

In accordance with various implementations, mechanisms for providing an enhanced remote control having multiple modes are provided.

Generally speaking, these mechanisms can provide an enhanced remote control that allows a user to control a media device and user interfaces displayed by the media device. Media devices can include, for example, a television, a set-top box, a smart television, a streaming media device, a digital media receiver, a computer, a gaming console, an optical media player, etc.

In some implementations, the enhanced remote control can include at least a touch sensor, a directional controller or directional pad, and a motion sensor. The touch sensor can, for example, be configured to detect when a surface of the touch sensor is contacted by an object, such as the user's thumb. In response to detecting that the touch sensor has been activated for a predetermined period of time, the enhanced remote control can switch between multiple modes—e.g., a first mode that uses the directional pad to control an interface displayed on a media device and a second mode that uses the motion sensor to control an interface displayed on the media device. This switch between modes can be performed without depressing the touch sensor. In addition, the touch sensor can be a selectable button that allows the user to select an item in the first mode and select an item in the second mode. These features can, for example, allow the user to operate the enhanced remote control in one of multiple modes while maintaining the user's thumb near the selectable touch sensor and the user's fingers around the body of the remote control (e.g., without the need to change the user's grip of the remote control).

In a more particular example, when the enhanced remote control is in a first mode, these mechanisms can allow the user to control the selection of items displayed on a media device, such as applications, programs, images, text, etc., by using the directional pad to navigate among items provided on a user interface. In such an example, the user can depress the selectable touch sensor to select an item that has been navigated to using the directional pad. It should be noted that, in some implementations, an item that has been navigated to can be identified (e.g., using a highlight region) to provide the user with feedback regarding which item can currently be selected.

In another more particular example, when the enhanced remote control is in a second mode, these mechanisms can allow the user to control the selection of items displayed on a media device, such as applications, programs, images, text, etc., by placing a cursor on an item provided on a user interface. The position of the cursor can be controlled based on motion and/or movements detected by the motion sensor of the enhanced remote control. In such an example, an item at a position that corresponds to the position of the cursor can be selected by depressing the selectable touch sensor. It should be noted that, in some implementations, an item that has been navigated to can be identified (e.g., using a highlight region) to provide the user with feedback regarding which item the cursor is placed on and can currently be selected.

This enhanced remote control can, for example, allow the user to select a desired mode from multiple modes for navigating through various user interfaces displayed on a media device.

It should be noted that the enhanced remote control can include any other suitable features, such as an alphanumeric keypad, a power button, an input button, channel buttons, volume buttons, a volume mute button, media playback buttons (e.g., rewind, pause, play, and fast-forward buttons), a dedicated button that accesses downloadable applications for use by the media device, a microphone or other suitable audio input, a camera, etc.

Turning to FIG. 1, an illustrative example of a generalized schematic diagram of a system 100 that includes a media device and an enhanced remote control is shown in accordance with some implementations of the disclosed subject matter.

As illustrated, system 100 can include an enhanced remote control 102 that can be used to control one or more media devices, such as a media device 120. Enhanced remote control 102 can be connected by a communications link 130 to a communications network 135 that can be linked via a communications link 140 to media device 120.

In a more particular example, as shown in FIG. 1, enhanced remote control 102 can include a touch sensor 106, a directional pad 108 (sometimes referred to herein as a "d-pad") or any other suitable directional input region, a processor 110, one or more input devices 112, a motion sensor 114, and a transmitter/receiver 116, which can be interconnected.

In some implementations, enhanced remote control 102 can include memory and/or storage (not shown) for storing a computer program for controlling processor 110. For example, the computer program can be stored in read-only memory (ROM), electrically programmable read only memory (EPROM), electrically erasable programmable read only memory (EEPROM), flash memory, etc.

Processor 110 can use the computer program to cause signals to be transmitted from enhanced remote control 102 through communications link 130 and communications network 135 to media device 120 via communications link 140. These signals can be transmitted using transmitter/receiver 116, which can include one or more transmitters, receivers, antennas, transmitter/receivers, etc. Transmitter/receiver 116 can transmit and/or receive signals using any suitable technologies and/or frequencies. For example, transmitter/receiver 116 can transmit and/or receive radio signals, infrared signals, near-infrared signals, ultrasonic signals, etc.

Communications links 130 and 140 can be any communications links suitable for communicating data between remote control 102 and media device 120, such as radio frequency links, infrared links, near-infrared links, wireless links, network links, any other suitable communications links, or any suitable combination of such links. In some implementations, communication link 130 and communication link 140 can be the same communication link or different communication links. For example, a radio signal (such as a microwave signal) can be sent from remote control 102 through communications network 135 (e.g., a space between remote control 102 and media device 120), which can then be received at media device 120. In such an example, communication link 130 and communication link 140 are the same (e.g., the microwave signal).

As another example, a radio signal (such as a microwave signal) can be sent from remote control 102 and received at a converter (not shown) that converts the microwave signal to a near-infrared signal. In such an example, the converter can transmit the near-infrared signal, which can then be received by media device 120. In this example, communication link 130 is the radio signal, and communication link 140 is the near-infrared signal and the converter is part of communications network 135.

Referring back to remote control 102, remote control 102 can include a touch sensor 106. Touch sensor 106 can include one or more touch sensors that are configured to detect when a surface is contacted by an object, such as a user's thumb. In such an implementation, each of the one or more touch sensors can be a capacitance-based touch sensor, a resistance-based touch sensor, a pressure based touch sensor, a light based sensor, etc. In a more particular implementation, touch sensor 106 can detect when the surface is contacted by a conductive object, such as human skin.

Processor 110 can receive output signals from touch sensor 106 to detect if touch sensor 106 has been activated. In some implementations, the output from touch sensor can be a binary indication of whether a touch has been registered by touch sensor 106. Additionally, in some implementations, a direction of motion and/or a speed of motion of an object contacting touch sensor 106 can be detected based on the output from touch sensor 106. For example, outputs from multiple touch sensors that make up touch sensor 106 can be detected and a pattern of the output can be interpreted to determine a direction of motion and/or a speed of the motion. In a more particular example, if a user moves her thumb from left to right across touch sensor 106, sensors located on the left side of touch sensor 106 can be activated prior to touch sensors on the right side of touch sensor 106. In this example, motion can be detected by determining a pattern in which the touch sensors are activated.

In some implementations, touch sensor 106 can also be a selectable button. As described herein, based on the mode, touch sensor 106 can be pressed by the user to select an item of interest—e.g., an item highlighted with a highlight region when the enhanced remote control is in a directional pad mode or an item indicated with a cursor or a pointer when the enhanced remote control is in a cursor mode. In particular, the user can press an OK button on the enhanced remote control, where a touch sensor is integrated with the OK button. This can, for example, allow a selection button and a sensor for switching between modes to be co-located.

In some implementations, remote control 102 can include a directional pad 108. Directional pad 108 can include a number of switches that, when activated, indicate a directional input. For example, directional pad 108 can include a button that a user can press to indicate a direction. This button can activate one or more of the switches, and a signal from the one or more switches can be correlated by processor 110 with a direction indicated by pressing the button.

Directional pad 108 and processor 110 can be configured to accept any suitable number of inputs for various directions in accordance with some implementations. For example, processor 110 can be configured to detect inputs in four directions (e.g., up, down, left and right) from directional pad 108. In another example, processor 110 can be configured to detect eight directional inputs (e.g., up, down, left, right and intermediate directions, such as, top-right diagonal, top-left diagonal, bottom-right diagonal, and bottom-left diagonal) from directional pad 108. In yet another example, processor 110 can be configured to detect inputs in any arbitrary direction from directional pad 108. In such an example, directional pad 108 can include touch sensors that can be used to detect an arbitrary position of an input to directional pad 108.

In some implementations, remote control 102 can include a motion sensor 114 or any other suitable component capable of detecting user motion. Any suitable motion sensing techniques can be used in motion sensor 114. For example, in some implementations, motion sensor 114 can include one or more gyroscopes that can detect rotational movement of remote control 102. Additionally or alternatively, motion sensor 114 can include one or more accelerometers that can detect linear movement and/or orientation of remote control 102. Additionally or alternatively, motion sensor 114 can include one or more magnetometers that can detect movement and/or orientation of remote control 102. In some implementations, motion sensor 114 can include one or more image sensors for detecting motion of remote control 102 using any suitable image analysis techniques.

Processor 110 can be configured to detect motion (e.g., rotational motion, linear motion, and/or orientation) based on signals from the motion sensor using any suitable techniques. When the user moves remote control 102 containing motion sensor 114 (e.g., an accelerometer, a gyroscope, or a magnetometer), motion sensor 114 can transmit motion information and/or orientation information relating to remote control 102 to processor 110. For example, rotational movement of remote control 102 can be detected by processor 110 using signals from one or more gyroscopes included in motion sensor 114 that can detect rotational movement of remote control 102. As another example, linear movement and/or orientation of remote control 102 can be detected by processor 110 using signals from one or more accelerometers included in motion sensor 114 that can detect linear movement and/or orientation of remote control 100. As yet another example, movement and/or orientation of remote control 102 can be detected by processor 110 using signals from one or more magnetometers included in motion sensor 114 that can detect movement and/or orientation of remote control 100 with respect to magnetic poles. As a further example, rotational movement and linear movement/orientation of remote control 102 can be detected by processor 110 using a combination of one or more gyroscopes, one or more accelerometers, and/or one or more magnetometers.

In some implementations, an output of motion sensor 114 can depend on a direction of motion (e.g., a direction of rotation, a direction of linear motion, etc.) as well as a speed of the motion.

In some implementations, remote control 102 can detect particular gestures performed by the user. For example, remote control 102 containing motion sensor 114 can transmit information indicating that the user is shaking remote control 102 to processor 110 and, in response to receiving the motion information, processor 110 can switch remote control 102 from one operational mode to another operational mode.

In some implementations, it should be noted that enhanced remote control 102 can include any other suitable input devices 112. Input devices 112 can include other suitable input features, such as an alphanumeric keypad, a power button, an input button, channel buttons, volume buttons, a volume mute button, directional buttons, media playback buttons (e.g., rewind, pause, play, and fast-forward buttons), a dedicated button that accesses downloadable applications for use by the media device, a microphone or other suitable audio input, a camera, etc. In some implementations, input devices 112 can include hardware buttons and/or software buttons (e.g., programmable buttons). In some implementations, input devices 112 can also include other inputs, such as, a computer keyboard, a cursor-controller, a dial, a switchbank, a lever, a touchscreen, and/or any other suitable input device.

System 100 can include one or more media devices 120, such as a media playback device for viewing media content listings and/or obtaining and presenting content items from various sources (e.g., broadcast content, on-demand content, locally stored content, Internet content, etc.). For example, media device 120 can be implemented as a television, a smart television, a set-top box, a streaming media device, a digital media receiver, a computer, a gaming console, an optical media player, etc. Enhanced remote control 102 and media device 120 can be local to each other or remote from each other. For example, enhanced remote control 102 and media device 120 can be located in the same room.

More particularly, media device 120 can include a display/input device 122, a processor 124, memory 126, and one or more transmitters, receivers, and/or transmitter/receivers 128, which can be interconnected.

In some implementations, media device 120 can include a storage device, such as a hard drive, a digital video recorder, a solid state storage device, a removable storage device, or any other suitable device for storing guidance information and/or remote control instructions. In a more particular example, the storage device can store a computer program for controlling processor 124 in media device 120 (e.g., responsive to instructions received from enhanced remote control 102).

Processor 124 can use the computer program to present content on display/input device 122 and control an interface that allows a user to interact with the content and to send and receive data through communication link 140 using transmitter/receiver 128. In some implementations, transmitter/receiver 128 can transmit and/or receive radio signals, infrared signals, near-infrared signals, ultrasonic signals, etc. In cases where transmitter/receiver 116 and transmitter/receiver 128 operate using different types of signals, a converter (not shown) can be used to convert instructions transmitted using one type of signal (e.g., a radio signal) to another type of signal (e.g., a near-infrared signal). It should be noted that data received through communications link 140 or any other communications links can be received from any suitable source. It should also be noted that transmitter/receiver 116 and transmitter/receiver 128 can operate using any suitable type of signals or combination thereof, including digital signals, analog signals, etc.

Display/input device 122 can include input devices such as a computer keyboard, a cursor-controller, one or more buttons, a dial, a switchbank, a lever, a touchscreen, and/or any other suitable input device.

In some implementations, instructions issued by enhanced remote control 102 can be formatted based on a model and/or brand of a media device 120 that is being controlled. For example, enhanced remote control 102 can be programmed with different codes and can act as a universal remote control for controlling different types of media devices. In some implementations, formatting can be performed by a converter (not shown) that converts signals transmitted by enhanced remote control 102 into signals used by a particular media device 120.

In a more particular example, enhanced remote control 102 and media device 120 can be any of a general purpose device such as a computer or a special purpose device such as a remote control, a smartphone, a tablet computer, a set-top box, a smart TV, a game console, a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 120 can be implemented as a set-top box, a digital media receiver, a smart TV, a television, a laptop computer, a personal computer, a server, a smartphone, a tablet computer, a game console, etc.

Figure 2:
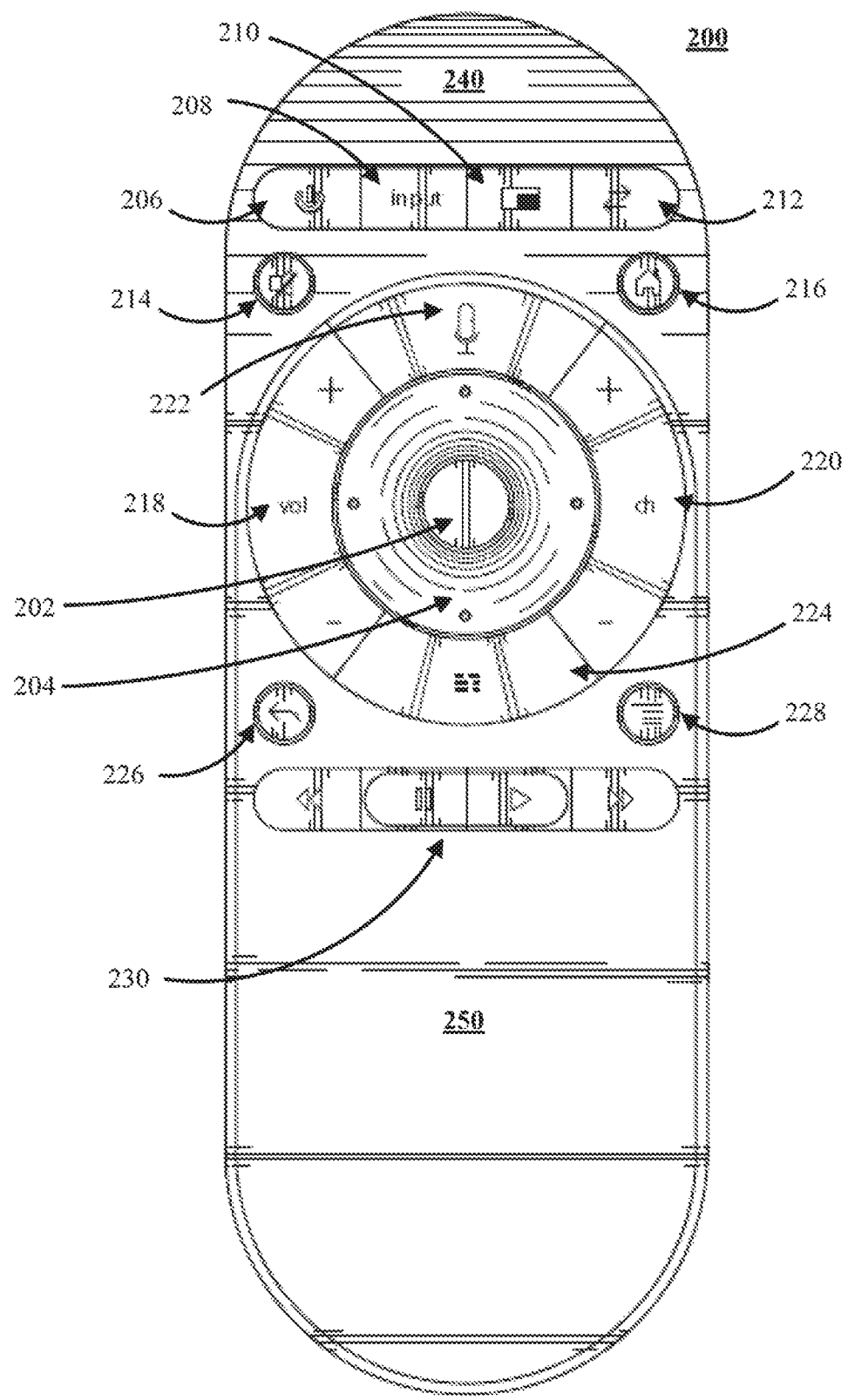
FIG. 2 shows an illustrative example of a top view of a remote control incorporating the mechanisms described herein in accordance with some implementations of the disclosed subject matter.

Turning to FIG. 2, an illustrative example of a top view of a remote control 200 embodying remote control 102 described in connection with FIG. 1 is shown in accordance with some implementations of the disclosed subject matter. In some implementations, remote control 200 can include various buttons, such as buttons 202-230, which can include a selectable touch sensitive button 202 and a directional pad 204. In some implementations, selectable touch sensitive button 202 can include a touch sensor, such as, touch sensor 106 of FIG. 1 that can detect touches of the surface of selectable touch sensitive button 202. Additionally, a processor, such as processor 110 of FIG. 1, can detect a depression of touch sensitive button 202 as a separate operation of touch sensitive button 202. For example, depressing selectable touch sensitive button 202 can complete (or inhibit) a circuit, and the completion of the circuit can be detected by processor 110. Any other suitable technique can also be used to indicate that touch sensitive button 202 has been pressed by the user. For example, depressing touch sensitive button 202 can change a capacitance of a circuit, activate a piezoelectric transducer, create a sound, etc.

As yet another example, a combination of signals can be required to indicate a press of selectable touch sensitive button 202. In a particular example, processor 110 can require both that a touch is sensed at touch sensitive button 202 and that a press of touch sensitive button 202 is sensed before responding to a button press of touch sensitive button 202. In some cases, this can inhibit accidental presses of touch sensitive button 202 (e.g., pressing by an inanimate object, such as a book, that is placed on top of remote control 200) from being interpreted by processor 110 as button presses by the user.

Remote control 200 can also include directional pad 204 which can be pressed to indicate directional inputs. For example, depressing directional pad 204 at a particular point can complete (or inhibit) one or more circuits, and the completion of the one or more circuits can be detected by processor 110. Processor 110 can then determine which direction was indicated based on which circuit(s) is completed. For example, if a right side (as shown in FIG. 2) of the directional pad is depressed, this can complete a circuit that indicates to processor 110 that the right side of the directional pad is pressed. In another example, directional pad 204 can include one or more touch sensors that detect directional inputs from the user (e.g., the user's thumb sliding from touch sensitive button 202 to a right portion of directional pad 204).

In some implementations, remote control 200 can also include motion sensor 114 (not shown in FIG. 2) for sensing rotational and/or linear motion of remote control 200, and/or orientation of remote control 200. For example, when the user moves remote control 200 containing motion sensor 114 (e.g., a gyroscope, an accelerometer, a magnetometer, etc.), motion sensor 114 can transmit motion and/or orientation information relating to remote control 200 to processor 110. As described herein, processor 110 can use motion sensor 114 to detect signals indicative of motion of remote control 200, detect signals indicative of the orientation of remote control (e.g., the keyboard portion is facing up), detect signals indicative of particular gestures (e.g., shaking, swinging, etc.), etc.

In some implementations, remote control 200 can operate in one of multiple modes based on input from a user. For example, a user can switch between the first mode and the second mode by contacting touch sensitive button 202 for a predetermined period of time (e.g., using the user's thumb). As another example, a user can shake remote control 200 to switch between the first mode and the second mode. As yet another example, the user can press a particular button on remote control 200 to switch between the first mode and the second mode. As still another example, the user can issue a voice command to switch between the first mode and the second mode.

In the first mode, remote control 200 can transmit instructions to a media device 120 for controlling a highlighted region that is displayed on a display connected to media device 120 based on directional inputs from directional pad 204 detected by processor 110 in accordance with some implementations. For example, a highlighted program (or channel or time slot) in an electronic program guide displayed by media device 120 can be controlled based on directional inputs from directional pad 204. In such an example, a user can control the location of the highlighted region (sometimes referred to herein as a "focus") within the electronic program guide using directional pad 204. It should be noted that the display connected to media device can be display 122 and/or another display connected to media device 120 via transmitter/receiver 128. It should be noted that the highlighted region can be highlighted using any suitable techniques. For example, a highlighted item can be surrounded by a different border than other items. As another example, a highlighted item can be displayed at a different brightness than other items. As yet another example, a highlighted item can be displayed using a different color than other items. As still another example, a highlighted item can be displayed in an enlarged state when compared to the same item that is not highlighted.

In another example, a highlighted image among an album of images displayed by media device 120 can be controlled based on directional inputs from directional pad 204. In such an example, a user can control which image is highlighted among an album of images displayed by media device 120.

In yet another example, a highlighted item in a list of multiple items, such as a menu, displayed by media device 120 can be controlled based on directional inputs from directional pad 204. In such an example, a user can control which item in the list is highlighted from the multiple items in the list. In a more particular example, a list of menu options can be displayed and the user can navigate the menu options using directional inputs to directional pad 204.

In the first mode, remote control 200 can also transmit instructions to media device 120 for selecting an item that corresponds to the highlighted region displayed on a display connected to media device 120 based on depression of the touch sensitive button 202 detected by processor 110 in accordance with some implementations. For example, a highlighted program from an electronic program guide can be selected to tune to a channel corresponding to the program, initiate recording of the program, call up information about the program, etc. As another example, a highlighted image can be selected from among an album of images to display at a larger size. As yet another example, a menu item can be selected to change a menu setting, select a category from a menu, etc.

In some implementations, in the first mode, processor 110 can transmit an instruction to move to a next page or a previous page in response to detecting motion across touch sensors 106, as described above in connection with FIG. 1. For example, a user can page up or page down by moving her thumb up or down (or left or right) across the surface of touch sensitive button 202.

In the second mode, remote control 200 can transmit instructions to media device 120 for displaying and controlling a position of a cursor to be displayed on a display connected to media device 120 based on outputs of motion sensor 114 detected by processor 110 in accordance with some implementations. For example, in some implementations, a cursor can be displayed on a display connected to media device 120 in response to remote control 200 transmitting an instruction to display a cursor. The cursor can be moved on a screen of the display to correspond to movements of remote control 200 that are sensed by motion sensor 114. More particularly, for example, rotational movement of remote control 200 and/or linear movement of remote control 200 can be interpreted by processor 110 and transmitted to media device 120 as commands to move the cursor.

In yet another example, motion information determined by motion sensor 114 in response to movements of remote control 200 can be transmitted to media device 120 without interpretation of the movements by processor 110. In such an example, media device 120 can interpret the motion information output from the motion sensor and control a position of the cursor accordingly.

In some implementations, a speed of motion indicated by motion sensor 114 can determine a speed at which the cursor moves on the display. For example, if a user moves remote control 200 faster, the cursor can be moved on the display more quickly.

In the second mode, remote control 200 can also transmit instructions to media device 120 for selecting an item that corresponds to a position of the cursor displayed on a display connected to media device 120 based on depression of touch sensitive button 202 detected by processor 110, in accordance with some implementations. For example, a user can select an image from among an album of images by navigating a position of the cursor to coincide with the image by moving remote control 200 and selecting the image that corresponds to the position of the cursor by depressing touch sensitive button 202.

As another example, a user can select parts of a document, such as text in a web page, by navigating the cursor to a first position in the document and depressing touch sensitive button 202. The user can then navigate the cursor to a second position in the document while holding down touch sensitive button 202. In such an example, a portion of document can be selected as the user moves the cursor and/or when the user releases touch sensitive button 202 when the cursor is at the second position. More particularly, for example, after the user depresses and holds touch sensitive button 202, as the user moves remote 200 causing the cursor to move, content between the first position and a current position of the cursor can be highlighted.

As yet another example, a user can select a link to a second page from a first page by navigating the cursor to a position that corresponds to the link and depressing and releasing touch sensitive button 202. In a more particular example, a user can navigate the cursor to a position of a hyperlink in a web page, and select the link by depressing touch sensitive button 202. In some implementations, a user can be required to press and hold touch sensitive button 202 for a specified period of time to navigate to a linked document. Additionally or alternatively, media device 120 can query the user as to whether the user wishes to navigate to the linked document prior to navigating to the linked document.

As still another example, a user can drag an item on a display connected to media device 120 from a first position on the display to a second position on the display by navigating the cursor to the item and selecting the item by depressing touch sensitive button 202. The user can then navigate the position of the cursor to the second position while continuing to depress touch sensitive button 202 in order to drag the item to the second position. When the item has reached the second position desired by the user, the user can release touch sensitive button 202 in order to release the item at the second position. This can facilitate moving items from one position on a screen to another (or from a position on one screen to a position on another screen), for example, to move files in a file system on media device 120 (or a device connected to media device 120). This can also facilitate the playing of games on media device 120 where the game can involve a user dragging a user interface item from a first position to a second position and then releasing the user interface item at the second position. This can, for example, allow media device 120 to present gaming applications that were designed for a personal computer using a mouse and cursor interface or a touchscreen using a touch interface using remote control 200 to control a cursor.

In some implementations, in the second mode, processor 110 can transmit an instruction to scroll a viewport displayed on media device in response to detecting depression of directional pad 204. For example, a user can scroll down on a web page being displayed by media device 120 by placing remote control 200 in the second mode and by pressing down on directional pad 204.

In some implementations, when remote control 200 transmits a signal to display a cursor to media device 120, the cursor can be displayed in any suitable position. For example, the cursor can be displayed in the center of a display connected to media device 120. As another example, the cursor can be displayed at a default location other than the center of the display connected to media device 120.

In some implementations, a user can reset the cursor (e.g., return the cursor to the default position) by performing a specific action. For example, in some implementations, a user can shake remote control 200 to reset the cursor. As another example, the user can turn remote control 200 over so that the bottom is facing up and then turn remote control 200 back over so that the top is facing up again. As yet another example, the user can press a particular combination of buttons to reset the cursor. As still another example, the user can trace a figure eight with remote control 200 held flat to reset the cursor.

In some implementations, when remote control 200 switches from the first mode to the second mode, display of the highlighted region associated with the first mode can be inhibited. For example, if a first image among an album of images is highlighted in the first mode, media device 120 can inhibit display of the highlighted region (or focus) corresponding to the first image when remote control 200 switches to the second mode. In this example, upon switching to the second mode, the cursor can be placed on the first image among the album of images that was previously highlighted.

In some implementations, media device 120 can transmit an instruction to remote control 200 to inhibit the ability to switch into the second mode based on a selected input. For example, in some implementations, media device 120 can be connected to other devices and/or to communication links that provide content to be displayed using media device 120. In a more particular example, media device 120 can be a television that is connected to a set-top box for delivering content from a cable provider. In this example, media device 120 may not be able to communicate with the set-top box to determine the content that is being displayed. For instance, media device 120 may not be able to determine that the set-top box is displaying an electronic program guide. In such cases, if media device 120 displays a cursor, the user cannot select anything with the cursor because media device 120 cannot ascertain where items are displayed on the screen by the set-top box.

In some implementations, remote control 200 can include an indicator (not shown) that indicates to a user whether remote control 200 is in the first mode or the second mode. For example, a ring LED around directional pad 204 can turn on or change color based on the mode. As another example, touch sensitive button 202 can be illuminated (e.g., backlit using an LED or the like, etc.) when the remote is in the second mode. As yet another example, remote control 200 can provide haptic feedback, such as vibration, when in the second mode.

In some implementations, an item at a position that corresponds to the cursor can be highlighted in a similar manner to an item that corresponds to the highlighted region moveable by the directional pad 204. For example, as the cursor moves across items displayed on a display connected to media device 120, an item at a position that corresponds to the position of the cursor on the display (e.g., an item that can currently be selected by depressing touch sensitive button 202) can be highlighted using any suitable techniques. It should be noted that this highlighting can be distinguished from the highlighted region that can be controlled using directional pad 204. For example, an item highlighted due to proximity of a cursor can be highlighted using a different technique or a variation of the same technique used to highlight an item highlighted using directional pad 204.

In some implementations, media device 120 (e.g., using transmitter/receiver 128) can transmit a signal to remote control 200 that instructs remote control 200 to switch into a particular mode. For example, if media device is a executing a particular application that specifies that a cursor is to be used, media device 120 can transmit a signal to remote control 200 instructing remote control 200 to switch to the second mode.

Figure 4:
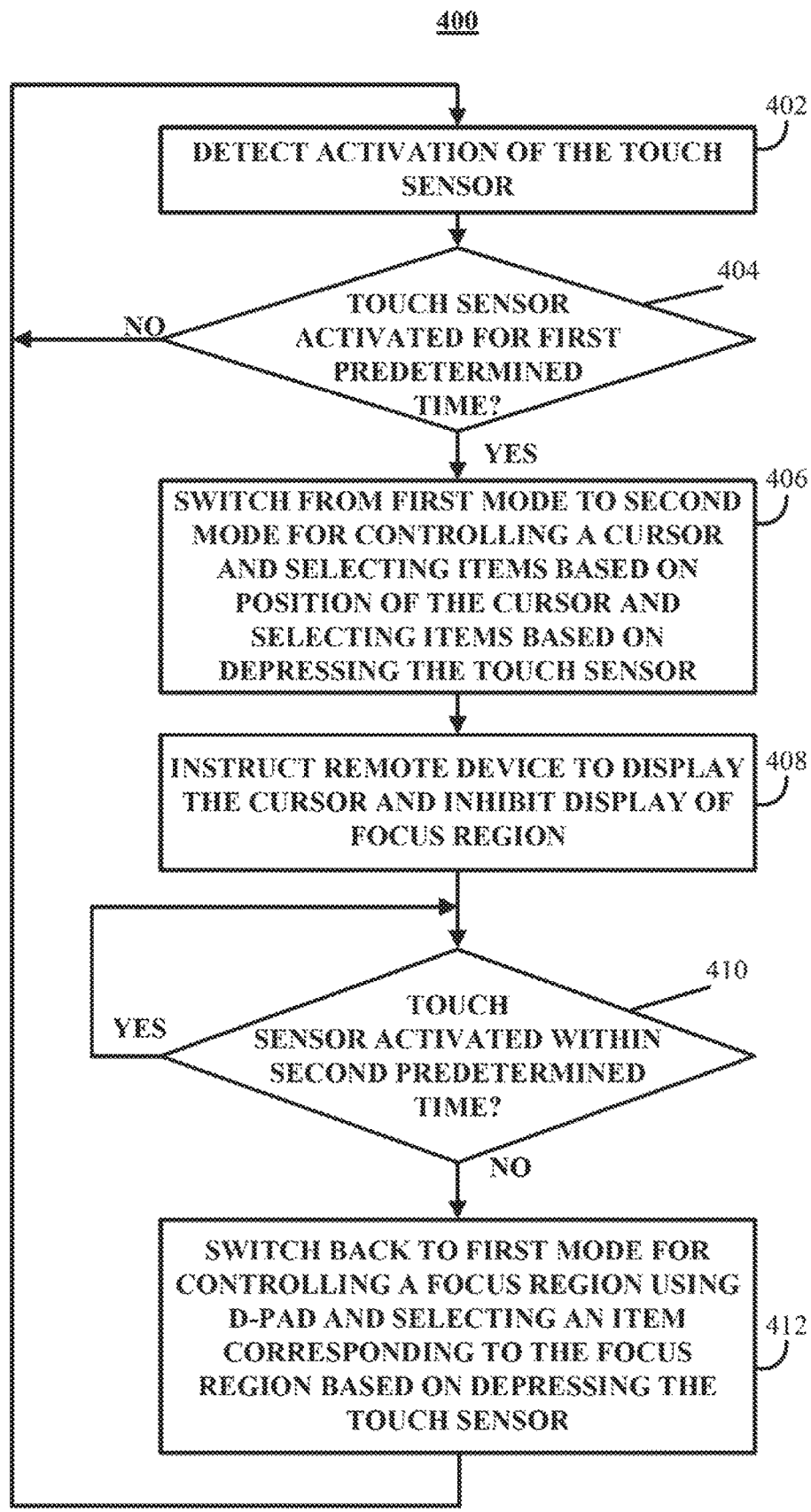
FIG. 4 shows an illustrative example of a process for switching a remote control incorporating the mechanisms described herein from a first mode to a second mode in accordance with some implementations of the disclosed subject matter.

FIG. 4 shows an example 400 of a process for switching remote control 200 between the first mode and the second mode in accordance with some implementations of the disclosed subject matter. At 402, processor 110 can detect activation of touch sensor 106 included in touch sensitive button 202. For example, if a user places his or her thumb on touch sensitive button 202, processor 110 can detect activation of touch sensor 106 in the surface of touch sensitive button 202. If activation of touch sensor 106 is detected at 402, process 400 can proceed to 404.

At 404, processor 110 can determine whether touch sensor 106 has been activated for a first predetermined amount of time (e.g., one second, two seconds, three seconds, etc.) in order to determine whether to switch from the first mode to the second mode at 406. For example, processor 110 can determine if touch sensor 106 has been activated for at least one second (or 1.5 seconds, two seconds, etc.). In some implementations, the first predetermined amount of time that touch sensor 106 has to be activated before switching from the first mode to the second mode can be set at a default amount of time (e.g., one second, two seconds, etc.) that can be changed by a user.

If processor 110 determines that touch sensor 106 has not been activated for the first predetermined amount of time ("NO" at 404), process 400 can return to 402 and continue to detect whether touch sensor 106 is activated. Otherwise, if processor 110 determines that touch sensor 106 has been activated for the first predetermined amount of time ("YES" at 404), process 400 can proceed to 406.

At 406, processor 110 can switch remote control 200 from the first mode to the second mode. In some implementations, motion sensor 114 can be deactivated in the first mode, and activated when remote control 200 is switched from the first mode to the second mode. Additionally or alternatively, if motion sensor 114 includes multiple motion sensors, such as one or more gyroscopes, one or more accelerometers, and/or one or more magnetometers, one or more of the motions sensors can be deactivated in the first mode and activated in the second mode. For example, this can reduce the amount of power used to monitor motion information when motion detection is less necessary.

At 408, processor 110 can transmit an instruction to media device 120 to display a cursor on a display connected to media device 120. In some implementations, as described above, this can include instructing media device 120 to inhibit display of a highlighted region associated with the first mode. For example, when processor 110 switches remote control 200 from the first mode to the second mode, processor 110 can also transmit a signal to media device 120 to inhibit display of any highlighted region associated with the first mode.

At 410, processor 110 can determine whether touch sensor 106 has been activated within a second predetermined period of time (e.g., the previous one second, two seconds, three seconds, etc.). If touch sensor 106 has been activated during the second predetermined period of time ("YES" at 410), processor 110 can return to 410 and continue to determine whether touch sensor 106 has been activated within the second predetermined period of time. On the other hand, if touch sensor 106 has not been activated within the second predetermined period of time ("YES" at 410), process 400 can move to 412 and switch back to the first mode. In some implementations, the second predetermined period of time can be set at a default amount of time (e.g., one second, two seconds, etc.) that can be changed by a user. Furthermore, in some implementations, the first and second predetermined period of time can be the same amount of time, or can be different amounts of time.

In some implementations, the predetermined periods of time for detecting whether the touch sensor has been triggered can be set by the user. For example, media device 120 can present an interface that allows the user to input the periods of times for performing such a detection (e.g., the user prefers a one second detection time). In response, media device 120 can transmit the user preferences to remote control 200 (e.g., using transmitter/receiver 128).

After switching back to the first mode at 410, processor 110 can return to 402 and continue to detect activation of touch sensor 106.

In an example of process 400, a user can cause remote control 200 to switch from the first mode to the second mode by touching touch sensitive button 202 with, for example, his or her thumb. The user's touch can be detected by processor 110 and after a first amount of time, such as two seconds, processor 110 can switch the remote control from the first mode to the second mode. When the remote is switched from the first mode to the second mode, a cursor can be displayed on a display connected to media device 120. The user can then control the position of the cursor through movement of the remote control, for example, by rotating the remote control in various directions corresponding to a direction in which the user wishes the cursor to move. As described above, a movement speed of the cursor can be correlated with the degree and or speed of the movement of remote control 200. As long as the user maintains contact (or re-establishes contact within a second amount of time, e.g., two seconds) with touch sensitive button 202, remote control 200 can remain in the second mode.

Referring back to remote control 200 in FIG. 2, remote control 200 can include other suitable input buttons in addition to touch sensitive button 202 and directional pad 204.

In some implementations, remote control 200 can include a power button 206 for controlling a power state of a media device, such as media device 120. For example, if power button 206 is depressed, processor 110 can cause a signal to be transmitted to media device 120 to power on (e.g., from an off or sleep state). Additionally, in some implementations, a selector (not shown) can be included that can be used to select a device from multiple devices to power on by pressing power button 206. Such a selector can be, for example, a sliding switch, buttons that each correspond to various media devices, etc. In some implementations, remote control 200 can include an indicator that indicates to a user which media device is currently selected.

In some implementations, remote control 200 can include an input button 208 for controlling a selected input of media device 120. For example, if media device 120 is a television, it can have multiple inputs such as, one or more High Definition Multimedia Interface (HDMI) inputs, one or more coaxial inputs, one or more component video inputs, one or more DisplayPort inputs, one or more fiber optic inputs, etc. Pressing input button 208 can cause processor 110 to transmit an instruction to media device 120 to change a selected input. Selecting an input can be performed using any suitable technique. For example, in some implementations, after pressing input button 208, a list of selectable inputs can be displayed on a display connected to media device 120 and a user can select a desired input by either holding down and/or repeatedly pressing input button 208, or by using directional pad 204 to navigate to a particular input and depressing touch sensitive 202 to select the particular input.

In some implementations, remote control 200 can include a picture-in-picture (PiP) button 210. For example, if a user depresses PiP button 210, processor 110 can transmit an instruction to media device 120 to display content from a second source (e.g., a second channel) over content from a first source currently being displayed (e.g., a first channel). In such an example, the content from the second source can be displayed, for instance, in a corner of a display connected to media device 120.

In some implementations, remote control 200 can include a mode button 212 for switching a mode of remote control 200. For example, rather than touching touch sensitive button 202 for a first predetermined period of time to switch modes, a user can press mode button 212 to switch from the first mode to the second mode and vice versa.

In some implementations, remote control 200 can include a mute button 214 for muting the sound output from media device 120.

In some implementations, remote control 200 can include a home button 216 for returning to a home screen of media device 120 and/or exiting from a current screen and returning to a main input. For example, if media device 120 that is being controlled using remote control 200 is a digital media receiver running an operating system that has a home screen, an instruction transmitted in response to pressing home button 216 can cause the digital media receiver to go to the home screen. As another example, if media device 120 that is being controlled using remote control 200 is a set-top box from a cable provider, an instruction transmitted in response to pressing home button 216 can cause the set-top box to exit any screen that is currently being displayed and return to a last channel that was tuned by the set-top box.

In some implementations, if media device 120 is currently running an application, pressing home button 216 can cause media device 120 to display a home screen of the application. Additionally, in such an implementation, pressing and holding home button 216 can cause media device 120 to go to a home screen of media device 120.

In some implementations, remote control 200 can include a volume button 218 and a channel button 220. Volume button 218 and channel button 220 can be used to control a volume output and a channel output respectively of media device 120. These buttons can be located on either side of directional pad 204. This can allow a user to reach volume button 218 and channel button 220 if the user holds remote control 200 in her hand with her thumb near touch sensitive button 202 and directional pad 204.

In some implementations, remote control 200 can include a voice command button 222 for initiating a voice command function on media device 120. After pressing voice command button 222, a user can be prompted to speak a voice command for causing media device 120 to perform some function. Any suitable techniques can be used to prompt a user for a voice command, such as, a sound, an image, etc. Alternatively, a user may not be prompted to speak a voice command, but pressing the button can cause an instruction to media device 120 to prepare to receive a voice command. Media device 120 and/or remote control 200 can be configured to recognize any suitable voice commands. For example, commands that replicate actions caused by pressing buttons on remote 200 can be recognized. As another example, a user can initiate a search using a voice command. As yet another example, a user can tune to a particular channel by number and/or by name (e.g., channel 451, channel 2, "CBA," "Food Channel," etc.).

In some implementations, a microphone for receiving voice commands can be included in media device 120. Additionally or alternatively, a microphone for receiving voice commands can be included in remote control 200. If a microphone is included in remote control 200, a voice command can be interpreted by processor 110 and/or can be sent to media device 120 for interpretation.

In some implementations, remote control 200 can include a guide button 224 that can initiate a program guide of available media content. For example, such a guide can be an electronic program guide that displays available programming to a user and can be organized based on time, channel, category, etc. As another example, such a guide can include a list of over-the-top content, such as television shows and/or movies, that are available to be retrieved and displayed by media device 120.

In some implementations, remote control 200 can include a back button 226 for navigating back to a previously displayed screen. For example, if a user is navigating a menu on media device 120, pressing back button 226 can cause the media device to go back to a previous level of the menu from which a current level was selected. As another example, if a user switched a channel that is tuned by media device 120 from a first channel to a second channel, pressing back can cause media device 120 to switch back to the first channel. As yet another example, if media device 120 is running an application, back button 226 can have a functionality assigned by the application, which can include a back functionality.

In some implementations, remote control 200 can include a menu button 228 for calling up a menu on media device 120. For example, pressing menu button 228 can cause media device 120 to open a menu. As another example, if media device 120 is running an application, pressing menu button 228 can cause additional options and/or a menu related to the application to be presented to the user.

In some implementations, remote control 200 can include media buttons 230 for controlling playback of media by media device 120. For example, media buttons 230 can include a play button, a pause button, a fast forward button, a rewind button, a skip forward button, any other suitable media buttons, and/or any suitable combination thereof. As illustrated in FIG. 2, buttons that a user may use more commonly (e.g., play and pause buttons) can be centrally located and raised as compared to less commonly used buttons (e.g., rewind and fast forward). Additionally or alternatively, different media buttons can have different shapes to differentiate the buttons from one another. These features can facilitate a user in pressing a correct button while the user's gaze is not directed at remote control 200, but is instead directed at, for example, a display connected to media device 120.

In some implementations, different sections of a top face of remote control 200 can be made contrasting colors. For example, in some implementations, a first section 240 can be one color (e.g., black) and a second section 250 can be a second color (e.g., white). In such an example, first section 240 can include buttons for controlling a media device and/or remote control 200 (e.g., power, input, mode, etc.) and second section 250 can include buttons for controlling a user interface of a media device (e.g., volume, channel, menu, navigation, selection, etc.).

In some implementations, certain buttons can have embossed lettering and/or symbols (e.g., "+" and "−" on channel button 220), and/or the buttons themselves can be raised (e.g., buttons 214, 216, 226 and 228) so that they can be more easily identified by a user without looking at remote control 200.

Figure 3:
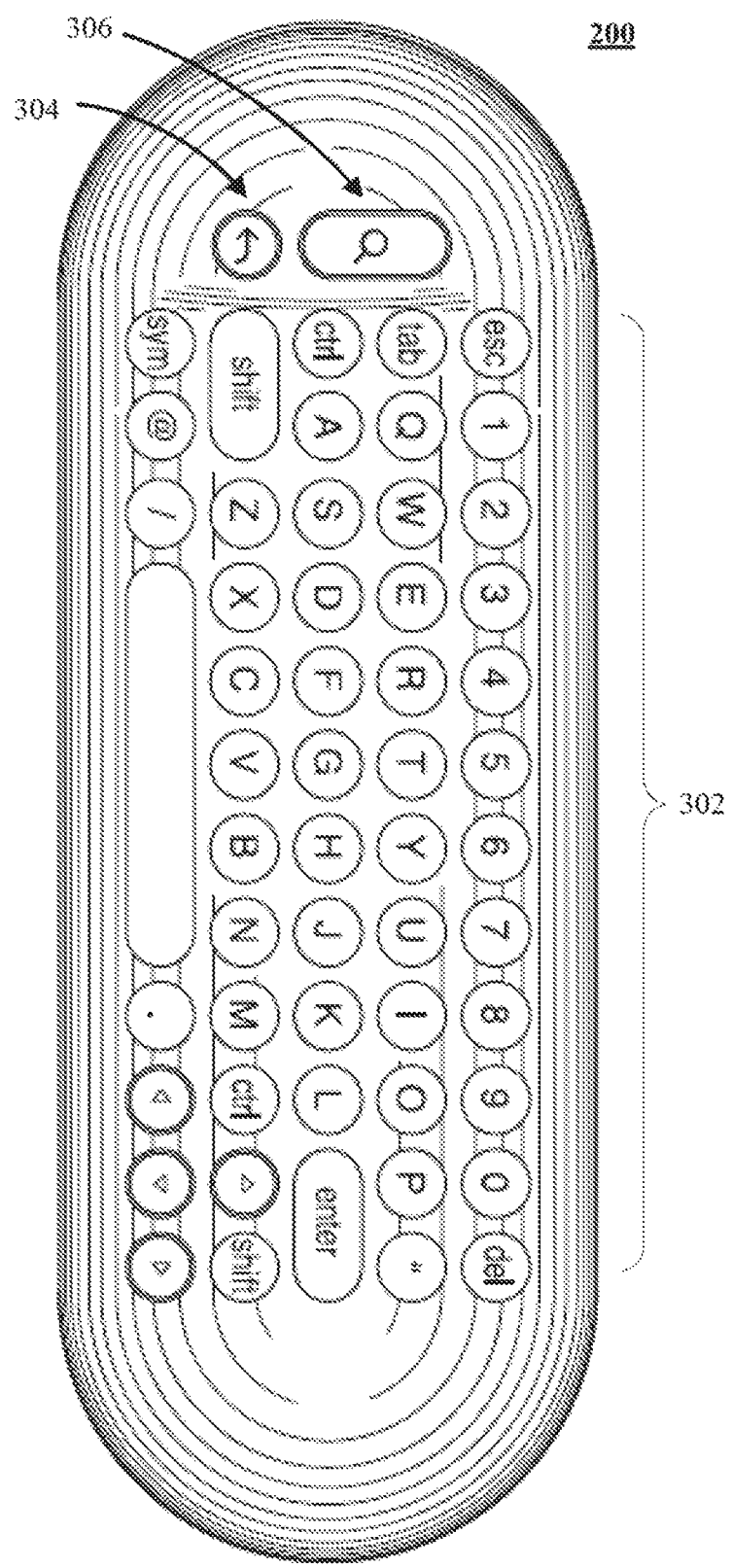
FIG. 3 shows an illustrative example of a bottom view of a remote control incorporating the mechanisms described herein in accordance with some implementations of the disclosed subject matter.

FIG. 3 shows an example of a bottom view of remote control 200 embodying remote control 102 described in connection with FIG. 1 in accordance with some implementations of the disclosed subject matter. As illustrated in FIG. 3, remote control 200 can include a keyboard 302. Keyboard 302 can include any suitable keys and/or any suitable layout of keys. For example, keyboard 302 can include, alphanumeric and special character keys (e.g., A-Z, 1-0, space, @, /, etc.), modifier keys (e.g., control (ctrl), shift, etc.), command keys (e.g., symbols (sym), escape (esc), tab, delete (del), etc.), and navigation keys (e.g., arrow keys). It should be noted that although keyboard 302 is shown having a QWERTY layout, any suitable layout can be used, such as, Dvorak, AZERTY, etc.

In some implementations, remote control 200 can include a back key 304 for navigating back to a previously displayed screen. Back key 304 can function similarly to back button 226 as described above in connection with FIG. 2.

In some implementations, remote control 200 can include a search key 306 for initiating a search using media device 120. For example, in response to detecting that a user has pressed search key 306, processor 110 can instruct media device 120 to initiate a search function. Such a search function can include be an Internet search (e.g., by navigating to a page that provides a search engine), a media search (e.g., searching media that is available on media device for download and/or streaming), a program search (e.g., searching electronic program guide data for a program matching a search query), or any other suitable type of search.

In some implementations, certain keys can be raised and/or have a different surface contour than other keys. For example, arrow keys of keyboard 302, back key 304 and search key 306 can be raised compared to other keys included in keyboard 302. As described above, this can assist a user in more easily identifying certain keys without looking at remote control 200. As another example, arrow keys of keyboard 302 can have a concave surface contour and the remaining keys can have a convex surface contour.

In some implementations, the keys on the bottom of remote control 200 (e.g., keyboard 302, back key 304 and search key 306) can require a specified amount of force to press the keys. For example, a force required to press the keys can be greater than a force that is applied to the keys by the weight of remote control 200 resting on a hard surface with the bottom side toward the hard surface. This can inhibit accidental key presses when remote control 200 is resting bottom side down on a hard surface, such as a table.

In some implementations, buttons 202-230 and/or keys 302-306 can be activated or deactivated based on an orientation of remote control 200. For example, motion sensor 114 can detect an orientation of remote control 200 with respect to gravity using one or more accelerometers. In another example, motion sensor 114 can detect an orientation of remote control 200 with respect to magnetic poles using one or more magnetometers. This orientation information can be used by processor 110 to control whether to activate buttons 202-230 or keys 302-306. For instance, inputs that are located on a side facing up (e.g., opposite of the force of gravity) can be activated, and input that are located on a side facing down can be deactivated. This can inhibit accidental presses of inputs (e.g., by a user's palm or fingers) on a bottom side when inputs on a top side are being used (e.g., by a user's thumb).

Figure 5:
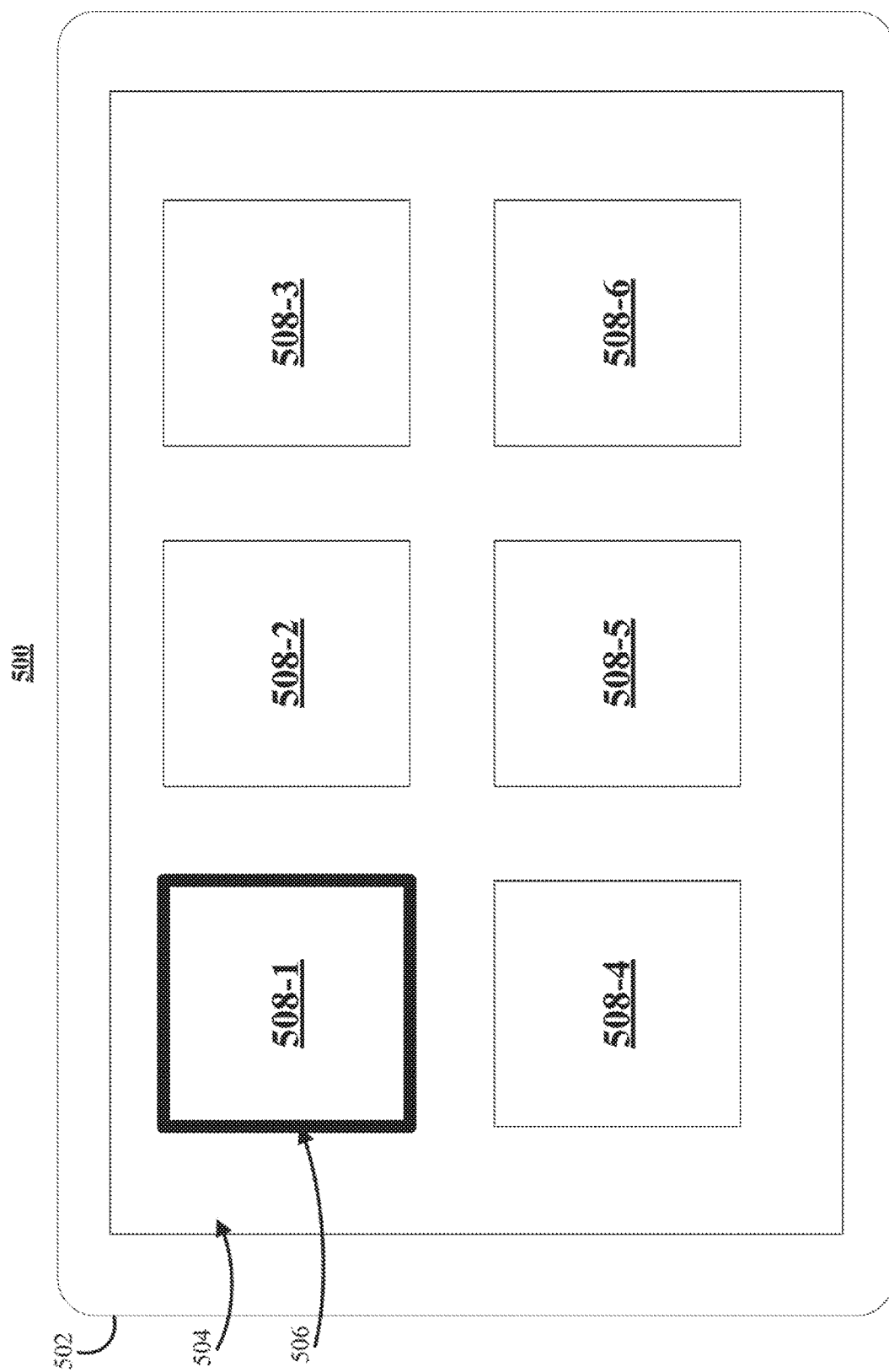
FIG. 5 shows an illustrative example of a media device being controlled using a first mode of a remote control incorporating the mechanisms described herein in accordance with some implementations.

Turning to FIG. 5, an example 500 of a media device 502 displaying a number of items 508-1 to 508-6 on a screen 504 is shown in accordance with some implementations. As shown, a highlighted region 506 (e.g., a focus) is displayed corresponding to item 508-1 and remote control 200 (not shown in FIG. 5) is operating in the first mode. As described above in connection with FIGS. 1 and 2, a user can control highlighted region 506 on media device 502 using directional pad 204. For example, a user can cause highlighted region 506 to move to item 508-2 by pressing "right" on directional pad 204. As another example, a user can cause highlighted region 506 to move to item 508-4 by pressing "down" on directional pad 204. As yet another example, in some implementations, by pressing a combination of "right" and "down" a user can cause highlighted region 506 to move to item 508-5. It should be noted that, although the embodiments described herein generally relate to pressing buttons or keys, such as pressing a portion of directional pad 204, this is merely illustrative. For example, processor 110 in remote control 102 can detect a user action at or near the surface of directional pad 204 (e.g., without pressing a portion of directional pad 204).

In some implementations, if a user presses a direction on directional pad 204 for which there is no item on screen 504, media device 502 can perform a page function in which one or more items of a next page replace one or more items of a current page.

As described above in connection with FIG. 2, the user can select an item at a position on screen 504 that corresponds to highlighted region 506 by depressing touch sensitive button 202. In the example of FIG. 5, if the user depresses touch sensitive button 202, media device 502 can receive the instruction from the enhanced remote control and can cause item 508-1 to be selected.

Figure 6:
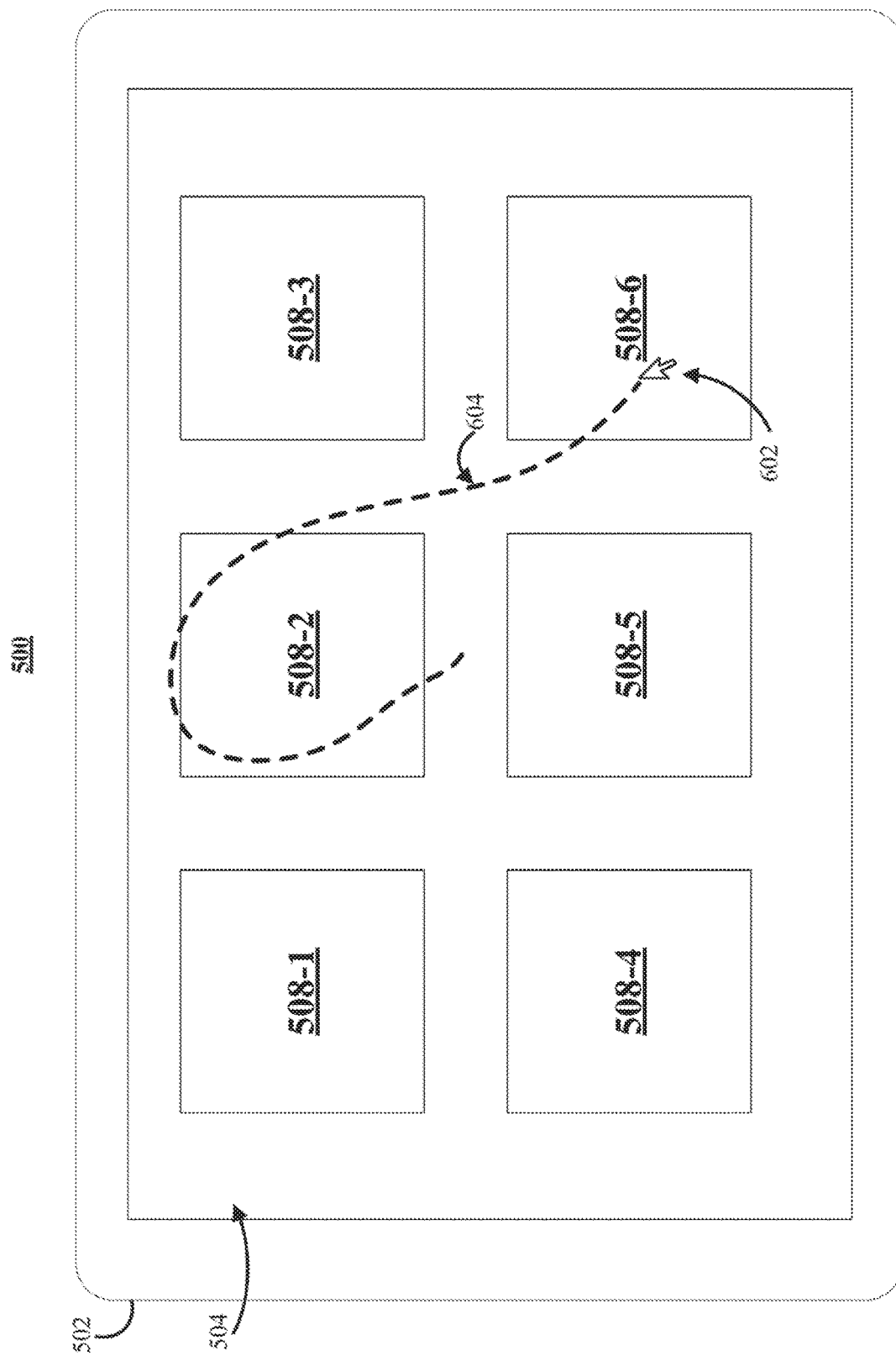
FIG. 6 shows an illustrative example of a media device being controlled using a second mode of a remote control incorporating the mechanisms described herein in accordance with some implementations.

FIG. 6 shows an example 600 of media device 502 displaying items 508-1 to 508-6 on screen 504 in accordance with some implementations. As shown, a cursor 602 is displayed and remote control 200 (not shown in FIG. 6) is operating in the second mode. As described above in connection with FIGS. 1 and 2, in the second mode, a user can move remote control 200 in order to move cursor 602 on screen 504 of media device 502. For example, line 604 shows a path taken by cursor 602 as the user moved remote control 200. As is illustrated, a user can move cursor 602 to an item displayed on screen 504. As described above in connection with FIG. 2, the user can select an item at a position on screen 504 that corresponds to a position of cursor 602 by depressing touch sensitive button 202. In the example of FIG. 6, if the user depresses touch sensitive button 202, media device 502 can receive the instruction from the enhanced remote control and can cause item 508-6 to be selected.

Figure 7A:
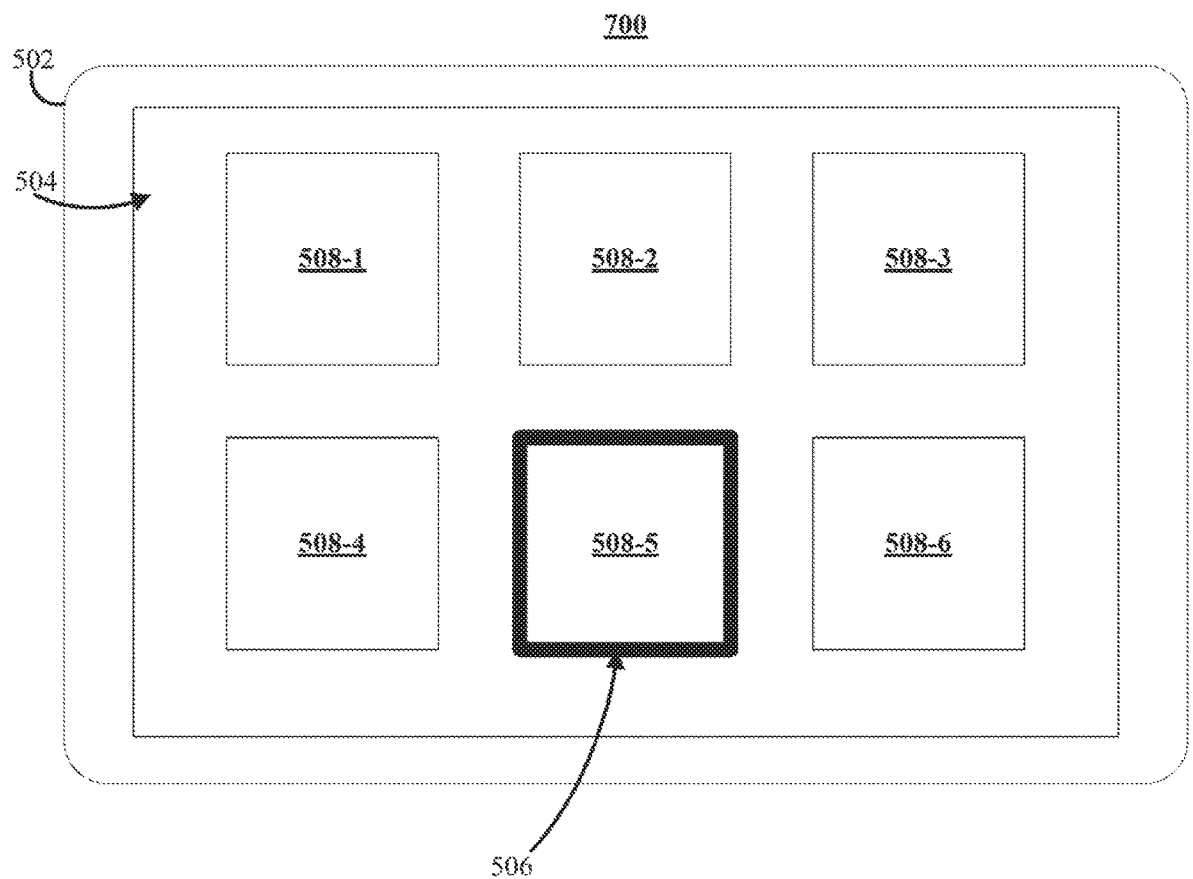
FIGS. 7A to 7C show an illustrative example of a media device performing a page function in response to receiving a command from a remote control incorporating the mechanisms described herein operating in a first mode in accordance with some implementations.
Figure 7A:
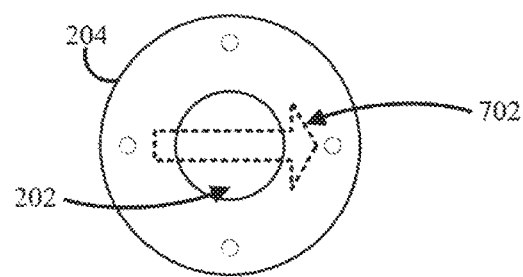
Figure 7B:
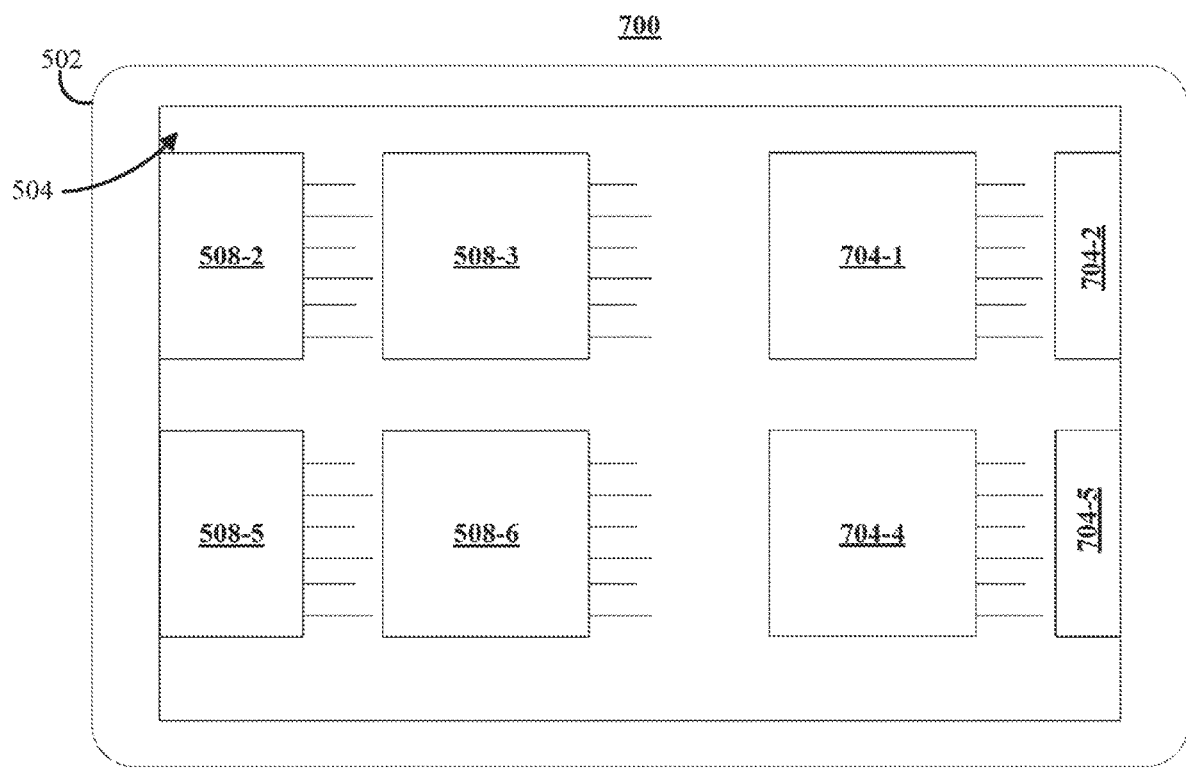
Figure 7C:
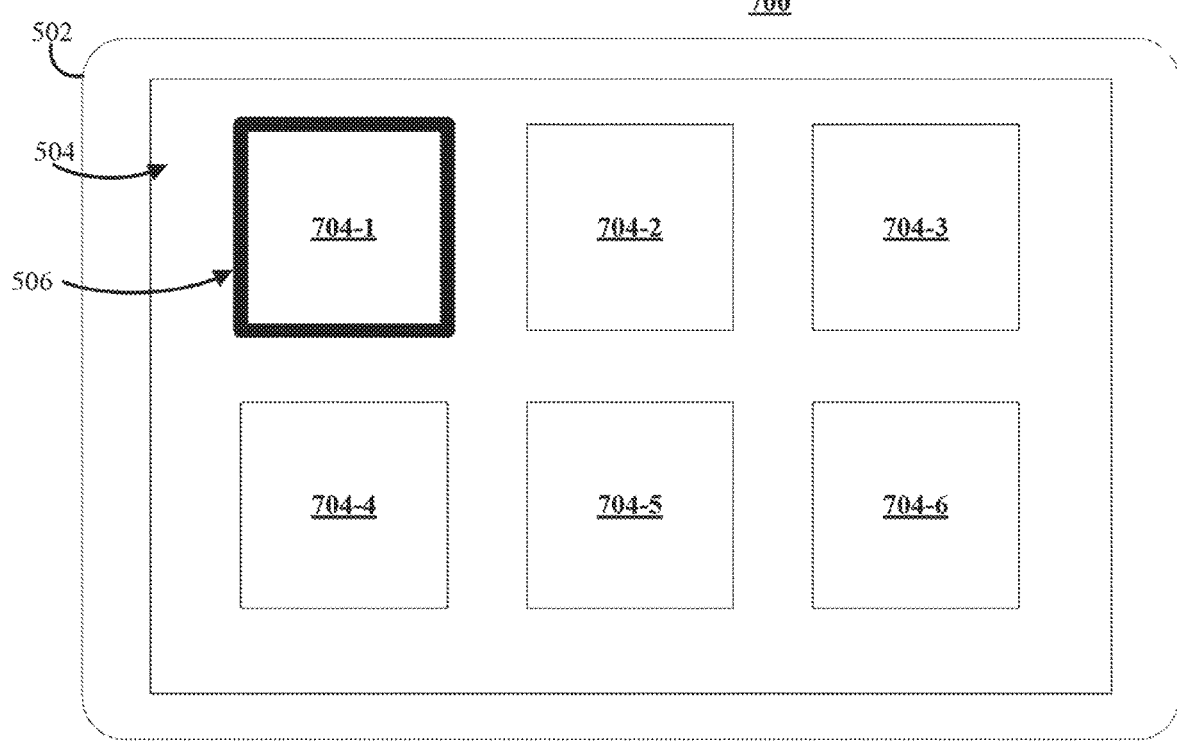

FIGS. 7A to 7C show an example 700 of a user performing a page function by moving the user's thumb in relation to touch sensitive button 202 of remote control 200 (of which only touch sensitive button 202 and directional pad 204 are shown). As illustrated in FIG. 7A, media device 502 is displaying items 508-1 to 508-6 and highlighted region 506 corresponds to item 508-5. In some implementations, if a user wishes to page to the right, the user can move the user's thumb (or any other suitable appendage) from left to right across the surface of touch sensitive button 202 as illustrated by broken arrow 702. In response to the rightward movement of the user's thumb on the surface of touch sensitive button 202, remote control 200 can transmit an instruction to media device 502 to page to the right.

As illustrated in FIGS. 7B and 7C, media device 502 can remove items 508-1 to 508-6 and replace them with items 704-1 to 704-6 on a next page. In some implementations, media device 502 can perform this action by showing an animation of items 508-1 to 508-6 moving off screen 504 to the left and items 704-1 to 704-6 moving onto screen 504 from the right. This can, for example, provide feedback to the user regarding whether media device is paging to the right as expected.

After navigating to the new page, media device 502 can display highlighted region 506 to correspond to a default item. For example, as illustrated in example 700, item 704-1 on the new page is highlighted using highlighted region 506.

Figure 8A:
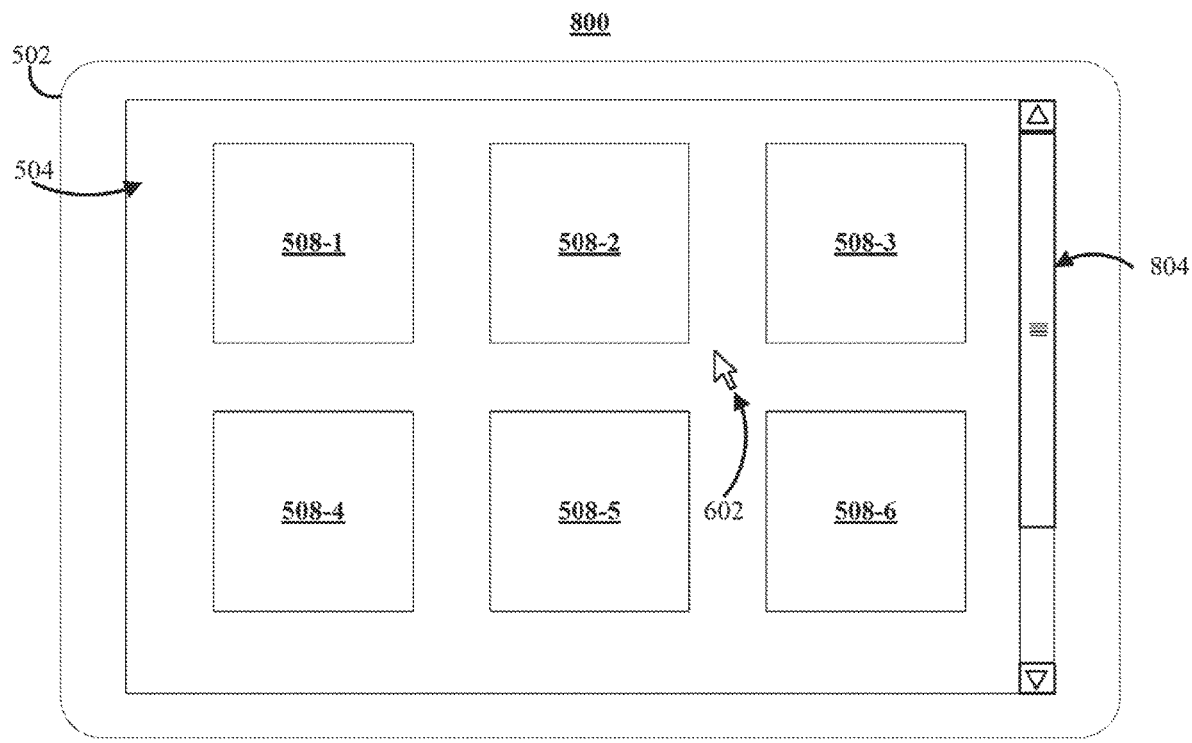
FIGS. 8A to 8C show an illustrative example of a media device performing a scroll function in response to receiving a command from a remote control incorporating the mechanisms described herein operating in a second mode in accordance with some implementations.
Figure 8A:
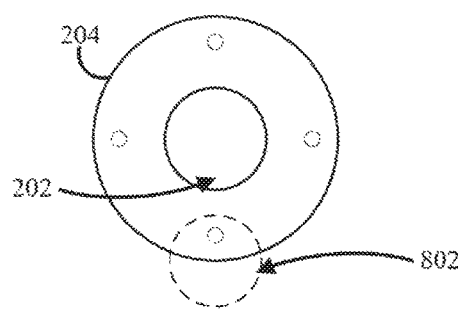
Figure 8B:
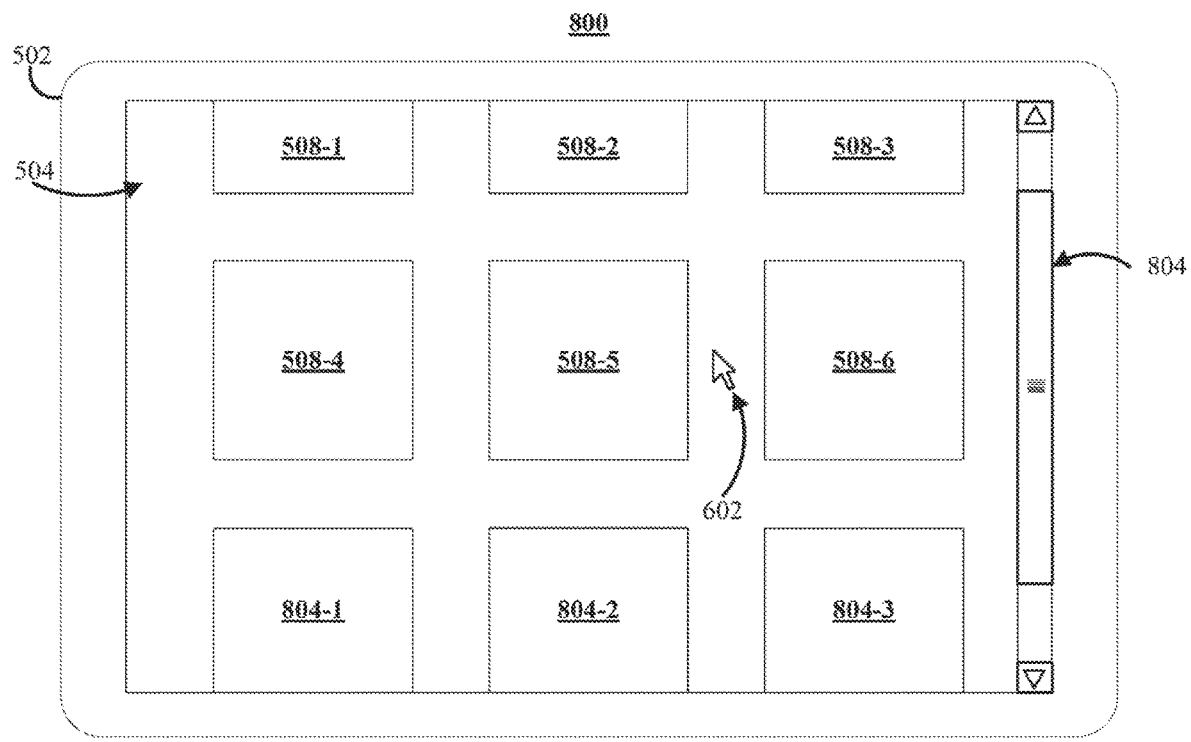
Figure 8C:
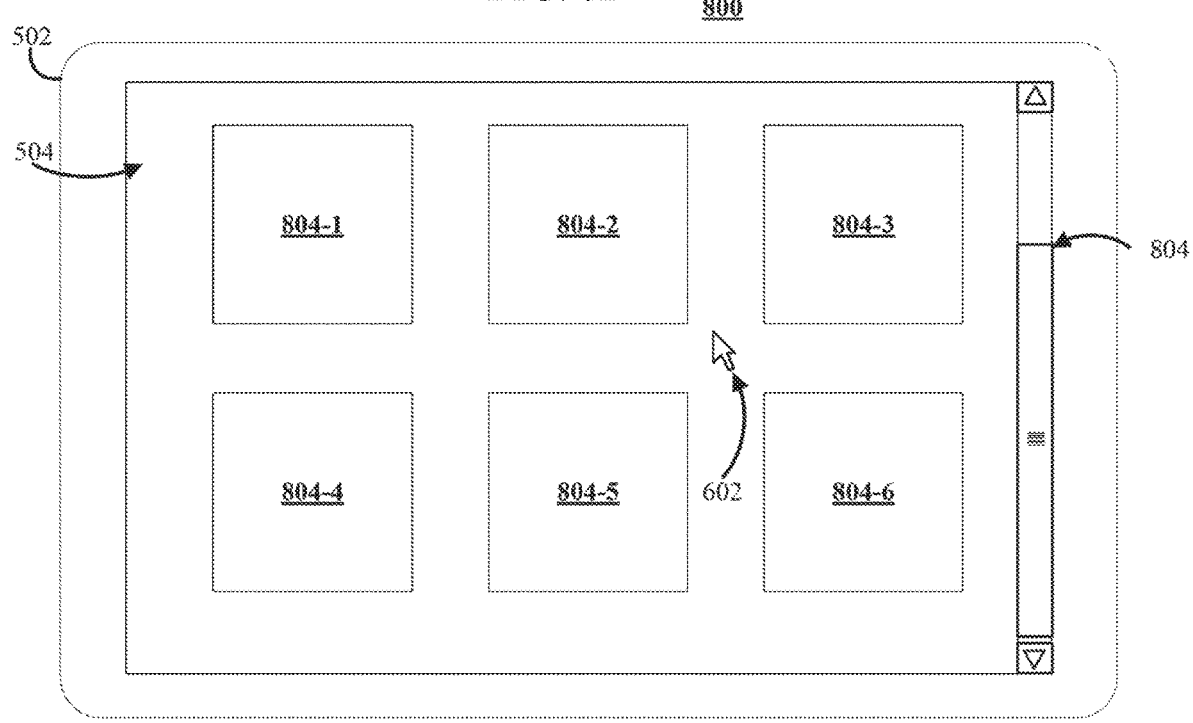

FIGS. 8A to 8C show an example 800 of a user performing a scroll function by pressing directional pad 204 of remote control 200 (of which only touch sensitive button 202 and directional pad 204 are shown). As shown, media device 502 is displaying items 508-1 to 508-6 and cursor 602 in the second mode. In some implementations, a scroll bar 804 can be shown to indicate that there is additional content not shown on screen 504. It should be noted that a similar technique can be used in the first mode to indicate that there are additional items located off screen.

In some implementations, if a user wishes to scroll down to show additional items when in the second mode, the user can move press "down" on directional pad 204, as illustrated by broken circle 802. In response to the press of "down" on directional pad 204, remote control 200 can transmit an instruction to media device 502 to scroll down.

As illustrated in FIGS. 8B and 8C, media device 502 can move items 508-1 to 508-6 (and/or move a viewport of a document currently displayed on media device 502) off of screen 502 as the user scrolls down and move items 804-1 to 804-6 onto screen 502. In some implementations, media device 502 can perform this action by showing an animation of the entire viewport (or a portion of the viewport) shown on screen 502 moving upward. This can, for example, provide feedback to the user regarding whether media device is scrolling down as expected.

Accordingly, systems, methods, and media for providing an enhanced remote control having multiple modes are provided.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes described in connection with FIGS. 4-8C can be executed or performed in any order or sequence not limited to the order and sequence shown and described in the figures. Also, some of the above steps of the processes of FIGS. 4-8C can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed:

1. A remote control device for controlling a media device, the remote control device comprising:
    a voice command button;
    a selectable touch sensor;
    an audio input device; and
    a hardware processor connected to the voice command button, the selectable touch sensor, and the audio input device, wherein the hardware processor is configured to:
        detect that the voice command button has been selected;
        in response to detecting that the voice command button has been selected, initiate a voice command function that activates the audio input device and prompts a user of the remote control device to provide a voice command;
        receive, via the audio input device, a voice command;
        transmit the voice command to the media device for interpreting the voice command in which a function is performed on the media device based on the interpreted voice command;
        transmit one or more inputs received by the selectable touch sensor to the media device in response to the function being performed on the media device;
        detect that the selectable touch sensor is activated for a predetermined period of time; and
        switch from a first mode of the remote control device to a second mode of the remote control device upon detecting that the selectable touch sensor has been activated for the predetermined period of time.

2. The remote control device of claim 1, wherein the hardware processor is further configured to:
    identify the function to be performed in response to receiving the voice command using a recognition technique; and
    transmit an instruction to the media device to perform the identified function.

3. The remote control device of claim 2, wherein the hardware processor is further configured to determine whether the received voice command replicates an action caused by pressing a button of a plurality of buttons on the remote control.

4. The remote control device of claim 2, wherein the hardware processor is further configured to:
    determine whether the received voice command corresponds with a request to initiate a search; and
    transmit an instruction to the media device to initiate a search function having a search query corresponding to the received voice command.

5. The remote control device of claim 2, wherein the hardware processor is further configured to:
    determine whether the received voice command corresponds with a request to provide content from a source of a plurality of sources based on the received voice command including a source identifier; and
    transmit an instruction to the media device to present content associated with the source having the source identifier.

6. The remote control device of claim 1, wherein the hardware processor is further configured to transmit the voice command to the media device to determine the function that corresponds with the voice command.

7. The remote control device of claim 1, wherein the hardware processor is further configured to transmit an instruction that causes a second audio input device on the media device to activate for receiving the voice command.

8. The remote control device of claim 1, wherein the selectable touch sensor further comprises at least one of: a capacitive touch sensor, a resistive touch sensor, and a piezoelectric touch sensor.

9. The remote control device of claim 1, wherein the hardware processor is further configured to detect a signal from the selectable touch sensor that is indicative of a presence of a conductor in proximity to a surface of the selectable touch sensor.

10. The remote control device of claim 1, wherein the selectable touch sensor further comprises a plurality of touch sensitive detectors, and wherein the hardware processor is further configured to control a page displayed by the media device in response to receiving one or more signals from one or more of the plurality of touch sensitive detectors indicative of motion relative to one or more of the plurality of touch sensitive detectors.

11. The remote control device of claim 1, further comprising:
a depressible directional input region disposed at the surface of the remote control device and around a periphery of the selectable touch sensor; and
a motion sensor that detects movement of the remote control device.

12. The remote control device of claim 11, wherein the first mode comprises deactivating the motion sensor, controlling a highlighted region displayed on the media device in response to an input provided on the directional input region, and selecting an item corresponding to the highlighted region in response to depression of the selectable touch sensor.

13. The remote control device of claim 11, wherein the first mode further comprises detecting a predetermined motion in response to receiving one or more signals from the motion sensor, and wherein the hardware processor is further configured to switch from the first mode to the second mode in response to detecting the predetermined motion.

14. The remote control device of claim 11, wherein the second mode comprises activating the motion sensor, causing a cursor that was not displayed in the first mode to be displayed on the media device, controlling a position of the cursor in response to an output of the motion sensor indicating motion of the remote control device, selecting an item corresponding to the position of the cursor in response to depression of the selectable touch sensor, and inhibiting the display of the highlighted region.

15. The remote control device of claim 11, wherein the second mode further comprises controlling a position of a viewport displayed on the media device in response to receiving one or more signals indicative of an input provided on the directional input region.

16. The remote control device of claim 1, wherein the second mode further comprises detecting that the selectable touch sensor is not activated for a second predetermined period of time, and wherein the hardware processor is further configured to switch from the second mode to the first mode upon detecting that the selectable touch sensor has not been activated for the second predetermined period of time.

17. The remote control device of claim 1, wherein the second mode further comprises controlling a position of a selected item displayed on the media device to coincide with the position of the cursor displayed on the media device in response to detecting continued depression of the selectable touch sensor.

18. The remote control device of claim 1, wherein the hardware processor is further configured to switch from the first mode to the second mode in response to detecting that the voice command button has been selected, initiating a voice command function that activates the audio input device and prompts the user of the remote control device to provide the voice command, and determining that the voice command corresponds to a request to switch from the first mode to the second mode.

19. The remote control device of claim 1, wherein the media device is a game console.

20. A method for controlling a media device, the method comprising:
detecting, using a hardware processor of a remote control device, that a voice command button connected to the hardware processor has been selected;
in response to detecting that the voice command button has been selected, initiating, using the hardware processor, a voice command function that activates an audio input device that is connected to the hardware processor and prompts a user of the remote control device to provide a voice command;
receiving, using the hardware processor, a voice command via the audio input device;
transmitting, using the hardware processor, the voice command to the media device for interpreting the voice command in which a function is performed on the media device based on the interpreted voice command;
transmitting, using the hardware processor, one or more inputs received by a selectable touch sensor to the media device in response to the function being performed on the media device;
detecting that the selectable touch sensor is activated for a predetermined period of time; and
switching from a first mode of the remote control device to a second mode of the remote control device upon detecting that the selectable touch sensor has been activated for the predetermined period of time.

21. A non-transitory computer-readable medium containing computer executable instructions that, when executed by a processor, cause the processor to perform a method for controlling a media device, the method comprising:
detecting, using a hardware processor of a remote control device, that a voice command button connected to the hardware processor has been selected;
in response to detecting that the voice command button has been selected, initiating, using the hardware processor, a voice command function that activates an audio input device that is connected to the hardware processor and prompts a user of the remote control device to provide a voice command;
receiving, using the hardware processor, a voice command via the audio input device;
transmitting, using the hardware processor, the voice command to the media device for interpreting the voice command in which a function is performed on the media device based on the interpreted voice command;
transmitting, using the hardware processor, one or more inputs received by a selectable touch sensor to the media device in response to the function being performed on the media device;
detecting that the selectable touch sensor is activated for a predetermined period of time; and
switching from a first mode of the remote control device to a second mode of the remote control device upon detecting that the selectable touch sensor has been activated for the predetermined period of time.

* * * * *